US010645593B2

(12) United States Patent
Barmettler et al.

(10) Patent No.: US 10,645,593 B2
(45) Date of Patent: May 5, 2020

(54) SYSTEMS AND METHODS FOR DETERMINING AND OPTIMIZING PERFORMANCE OF WIRELESS NETWORKS HAVING MULTIPLE ACCESS POINTS

(71) Applicant: Greenlee Textron Inc., Rockford, IL (US)

(72) Inventors: Mark Barmettler, San Diego, CA (US); Jason Edward Butchko, Temecula, CA (US)

(73) Assignee: Tempo Communications, Inc., Vista, CA (US)

( * ) Notice: Subject to any disclaimer, the term of this patent is extended or adjusted under 35 U.S.C. 154(b) by 167 days.

(21) Appl. No.: 15/487,147

(22) Filed: Apr. 13, 2017

(65) Prior Publication Data
US 2017/0303138 A1    Oct. 19, 2017

Related U.S. Application Data

(60) Provisional application No. 62/323,116, filed on Apr. 15, 2016.

(51) Int. Cl.
*H04W 24/08*    (2009.01)
*H04W 16/18*    (2009.01)
(Continued)

(52) U.S. Cl.
CPC .......... *H04W 16/18* (2013.01); *H04W 24/02* (2013.01); *H04W 24/08* (2013.01);
(Continued)

(58) Field of Classification Search
CPC ..... H04W 16/18; H04W 24/08; H04W 24/02; H04W 72/0453; H04W 84/12; H04W 16/02; H04W 88/08
See application file for complete search history.

(56) References Cited

U.S. PATENT DOCUMENTS 6,499,006 B1    12/2002    Rappaport et al.
7,539,489 B1    5/2009    Alexande
(Continued)

FOREIGN PATENT DOCUMENTS

| EP | 2874429 A1 | 5/2015 |
|---|---|---|
| WO | 2009022054 A1 | 2/2009 |
| WO | 2013152305 A1 | 10/2013 |

OTHER PUBLICATIONS

AirCheck Wi-Fi Tester—Wireless Network Tester—Fluke Networks—w2ww.flukenetworks.com/enterprise-network/network-testing/AirCheckWi-FI-Tester 2 pages Oct. 9, 2013.
(Continued)

*Primary Examiner* — Jay P Patel
(74) *Attorney, Agent, or Firm* — Erise IP, P.A.

(57) ABSTRACT

A system for determining and optimizing wireless network performance of a network having at least two access points comprises a plurality of wireless instruments configured to send, receive, and measure received wireless signals in a monitored area. The system further comprises a master controller in communication with the wireless instruments to form a distributed wireless network testing solution. The master controller is configured to send wireless signals to and receive wireless signals from the wireless instruments, measure the received wireless signals, and perform an analysis of the wireless signals to determine a radio frequency environment performance of the distributed wireless network based at least in part on the wireless signals.

18 Claims, 26 Drawing Sheets

(51) Int. Cl.
*H04W 24/02* (2009.01)
*H04W 72/04* (2009.01)
*H04W 84/12* (2009.01)
*H04W 16/02* (2009.01)
*H04W 88/08* (2009.01)

(52) U.S. Cl.
CPC ........ *H04W 72/0453* (2013.01); *H04W 16/02* (2013.01); *H04W 84/12* (2013.01); *H04W 88/08* (2013.01)

(56) References Cited

U.S. PATENT DOCUMENTS

| | | | |
|---|---|---|---|
| 7,574,202 B1* | 8/2009 | Tsao | H04L 63/0272 370/310 |
| 7,596,373 B2 | 9/2009 | McGregor et al. | |
| 7,889,663 B1 | 2/2011 | Wright et al. | |
| 8,023,418 B2 | 9/2011 | Curley | |
| 8,390,515 B2 | 3/2013 | Ketonen | |
| 8,416,710 B2* | 4/2013 | Brisebois | H04W 24/00 370/254 |
| 8,625,441 B2 | 1/2014 | Hittel et al. | |
| 8,654,660 B2 | 2/2014 | Ketonen | |
| 8,750,806 B2* | 6/2014 | Weil | H04L 43/50 370/230 |
| 8,824,328 B2 | 9/2014 | Dhanapal | |
| 9,002,349 B2* | 4/2015 | Naguib | G01S 5/021 455/424 |
| 9,781,609 B1* | 10/2017 | Kurtz | H04W 24/02 |
| 9,924,388 B2 | 3/2018 | Zhang | |
| 2002/0111772 A1 | 8/2002 | Skidmore et al. | |
| 2003/0055604 A1 | 3/2003 | Skidmore et al. | |
| 2003/0229478 A1 | 12/2003 | Rappaport et al. | |
| 2004/0137915 A1 | 7/2004 | Diener | |
| 2004/0165548 A1* | 8/2004 | Backes | H04W 52/0216 370/328 |
| 2005/0003827 A1* | 1/2005 | Whelan | H04W 16/10 455/454 |
| 2005/0043933 A1 | 2/2005 | Rappaport et al. | |
| 2005/0055604 A1 | 3/2005 | Skidmore et al. | |
| 2005/0265321 A1* | 12/2005 | Rappaport | H04L 41/145 370/352 |
| 2006/0094370 A1* | 5/2006 | Nguyen | H04W 52/50 455/67.13 |
| 2006/0094371 A1* | 5/2006 | Nguyen | H04W 52/50 455/67.13 |
| 2007/0082677 A1 | 4/2007 | Hart et al. | |
| 2009/0003219 A1 | 1/2009 | Beacham | |
| 2010/0124886 A1 | 5/2010 | Fordham | |
| 2010/0290359 A1 | 11/2010 | Dewey | |
| 2012/0115523 A1* | 5/2012 | Shpak | H04B 7/024 455/507 |
| 2012/0129559 A1 | 5/2012 | Pochop, Jr. | |
| 2012/0307662 A1 | 12/2012 | Puolakka et al. | |
| 2013/0051252 A1 | 2/2013 | Ciavattone | |
| 2014/0029450 A1 | 1/2014 | Vitek | |
| 2014/0160971 A1 | 6/2014 | Ketonen | |
| 2014/0160972 A1 | 6/2014 | Ketonen | |
| 2014/0328190 A1* | 11/2014 | Lord | H04W 24/08 370/252 |
| 2014/0330541 A1 | 11/2014 | Natarajan | |
| 2015/0085746 A1* | 3/2015 | Somayazulu | H04W 48/08 370/328 |
| 2015/0103685 A1 | 4/2015 | Butchko | |
| 2015/0131483 A1 | 5/2015 | Colban | |
| 2015/0212633 A1 | 7/2015 | Flanagan | |
| 2015/0304816 A1* | 10/2015 | Al-Najjar | G01S 5/0252 455/456.1 |
| 2016/0014613 A1* | 1/2016 | Ponnampalam | H04W 16/18 370/254 |
| 2016/0191357 A1 | 6/2016 | Omer | |
| 2016/0323760 A1 | 11/2016 | Zhang et al. | |
| 2016/0373944 A1 | 12/2016 | Jain | |
| 2017/0078896 A1* | 3/2017 | Kephart, Jr. | H04L 41/0823 |
| 2017/0171760 A1 | 6/2017 | Kamalakannan | |
| 2017/0223551 A1* | 8/2017 | Huang | H04W 36/00837 |
| 2017/0238346 A1 | 8/2017 | Egner | |
| 2017/0286127 A1* | 10/2017 | Artman | G06F 9/4411 |
| 2017/0336494 A1* | 11/2017 | Han | G01S 11/06 |

OTHER PUBLICATIONS

European Patent Application 14187880.1 European Examination Report dated Apr. 16, 2015.
European Patent Application No. 14187880.1 Office Action dated Jun. 28, 2017.
Fluke Networks, "Airmagnet Planner Technical Data," Copyright 2011.
Greenlee Communications, "AirScout Automated WiFi Readiness," http://www.greenleecommunications.com/products/airscout-wifi-readiness.html, printed Apr. 19, 2016, Copyright 2016.
Greenlee Textron, Inc., "Greenlee Communications AirScout Instruction Manual 52075869REV01," Copyright 2016.
IBwave, "In-Building Wireless Network Design Software, iBwave Design," http://www.ibwave.com/Products/iBwaveDesign.aspx. printed Apr. 19, 2016, posted unknown.
PCT Patent Application PCT/US2016/018826 International Search Report and Written Opinion dated May 10, 2016, 15 pages.
European Patent Application 17166913.8 Search Report dated Oct. 8, 2017.
Greenlee Textron, Inc., "Project Orion," Jul. 31, 2014.

* cited by examiner

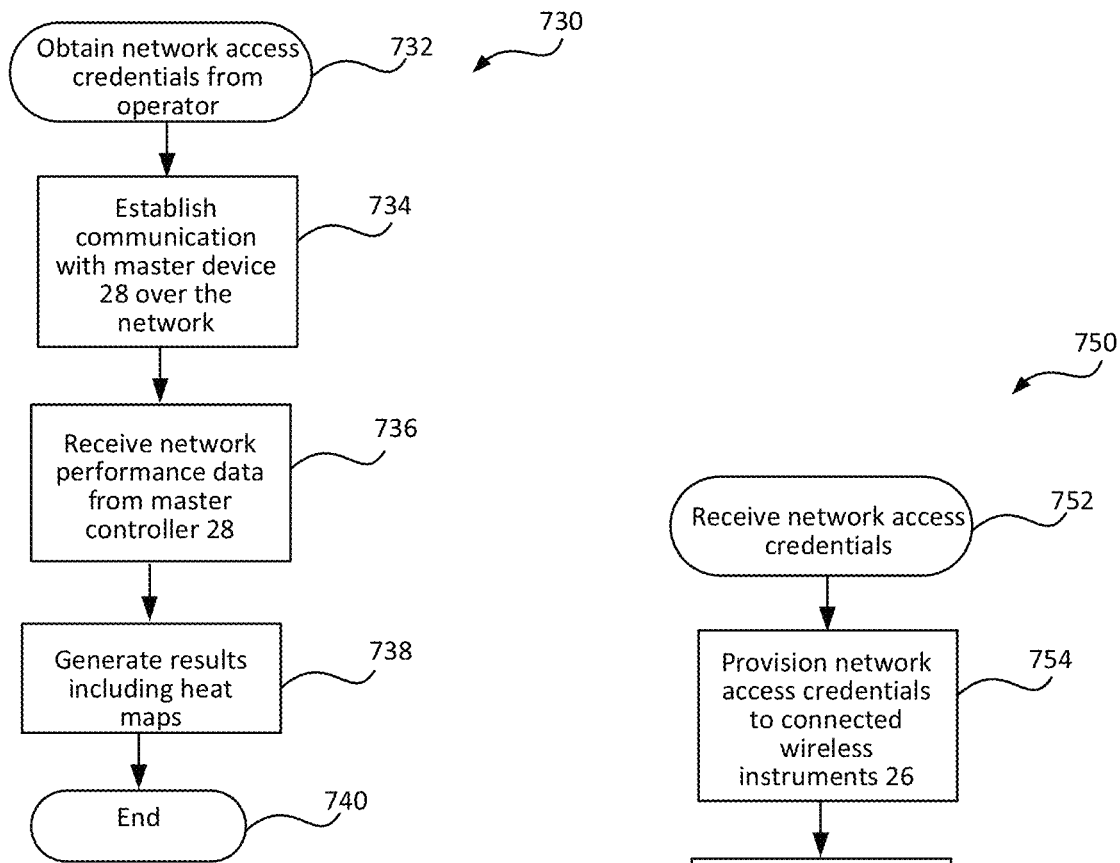
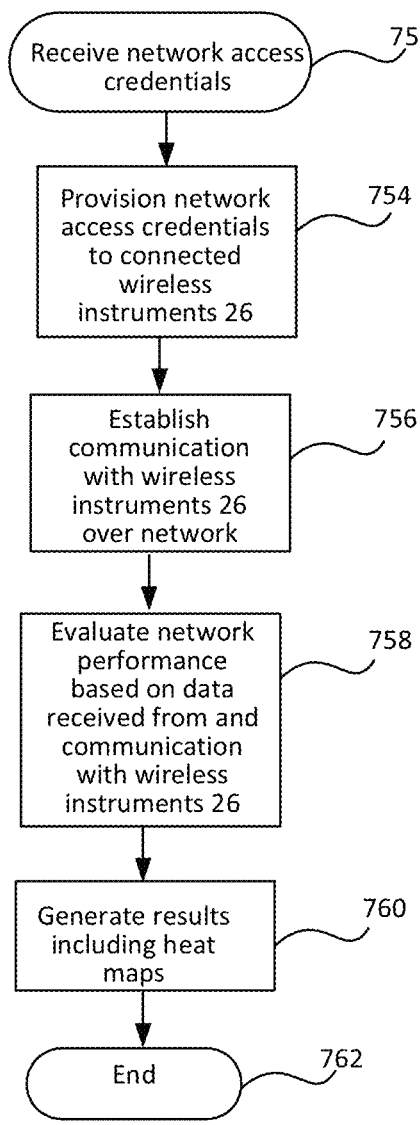
Figure 10A
Figure 10B

Multi Access Point Solution

Exemplary pre-provisioning set up page used to tell the system how to behave. "Professional mode" enables multiple access points.

Physical locations of wireless instruments can be indicated on a floor plan of the deployment enviroment First floor view Second floor view Radio frequency environment performance can be visualized on the floor plan Isometric heat map view First floor heat map view

SYSTEMS AND METHODS FOR DETERMINING AND OPTIMIZING PERFORMANCE OF WIRELESS NETWORKS HAVING MULTIPLE ACCESS POINTS

RELATED APPLICATIONS

This non-provisional patent application claims priority benefit, with regard to all common subject matter, of earlier-filed U.S. Provisional Patent Application No. 62/323,116 filed Apr. 15, 2016 and entitled Systems and Methods for Determining and Optimizing Performance of Wireless Networks having Multiple Access Points. The identified earlier-filed provisional patent application is hereby incorporated by reference in its entirety into the present disclosure.

BACKGROUND

1. Field

The present disclosure relates generally to the field of determining and optimizing performance of wireless networks. More specifically, the present disclosure relates to the use of a distributed test system to test and optimize the performance of a wireless network having multiple access points.

2. Related Art

Wireless networks use high-frequency radio waves rather than wires to communicate between nodes. A chief benefit of such wireless networks over wired networks is the mobility they afford, as coupling all the network nodes with wires in wired networks may be cumbersome, unseemly, costly, and otherwise unfeasible. At least in part due to these benefits, wireless networks have become ubiquitous. However, wireless networks also have certain shortcomings, key among which is their limited range and their susceptibility to interference. Because of interference, and congestion and other signal issues, users of a wireless network may experience degradation of services over the wireless network depending on where the user computing devices coupled to the network are located, which may be undesirable.

It is known that proper placement of wireless transceivers such as Wi-Fi™ access points, gateways, routers, repeaters, range extenders, as well as the user computing wireless devices in a building or premises, may improve the wireless network quality of service. Nevertheless, such devices are often situated in a manner that results in inconsistent or poor quality of service across the building or premises. This may be because the users of the wireless network, or the technicians setting up the wireless network, have the tendency to simply select the most convenient location for the wireless access points, and do not give due consideration to the interference or attenuation caused by the building or other devices therein. Resultantly, the users of the wireless network often experience degradation of services over the network, which may necessitate excessive service and repair calls and visits, and may lead to customer dissatisfaction and turnover.

Such problems are only exacerbated by the fact that existing wireless network devices, at least generally, are configured for wireless network usage only and are not configured for wireless network testing. There exist some wireless network devices, however, they generally require that a technician walk to each location within the premises served by the wireless network to validate the wireless network quality of service. This may be inconvenient, particularly where the premises served by the network is a multi-story building or otherwise covers a large area. If the quality of service is unacceptable at any location within the premises, technicians must move the wireless network access point, repeater, or range extender to a new position, or install additional such devices at new locations in an attempt to increase network performance. The technician must then repeat the entire quality of service validation, which may be time consuming and therefore add to the costs of setting up wireless networks.

The wireless network testing devices currently in existence are also generally of limited use as they do not allow the installer or technician to select either an initial location or a secondary position for the access point and other wireless network devices based at least in part on objective performance criteria that can be used by the installer to maximize network performance, minimize network cost, or meet other criteria for the network.

Systems and methods of the present disclosure allow for a more robust testing of wireless networks having multiple access points and eliminate or at least mitigate wireless network service degradation caused by improper placement of wireless access points, and other such factors.

SUMMARY

Systems and methods to evaluate and optimize the performance of a wireless network having two or more access points using a solitary distributed test system are disclosed herein. The distributed test system may comprise a master controller, a user interface device communicatively coupled therewith, and wireless enabled client devices that are distributed throughout the network environment. Network access credentials may be provisioned to the distributed test system. The client devices may communicate with the master controller, such as wirelessly and/or via a wired connection. The network access credentials may, for example, be input via the user interface device, which may be a mobile device (such as laptop, smart phone, et cetera) configured to communicate with the master controller. Alternatively, the user interface device may be integrated into the master controller. The master controller may then provision the network access credentials to the individual client devices. The master controller may be physically or wirelessly connected to the network and to the client devices distributed throughout the network environment. Each client device may look for the strongest access point within range (e.g., the access point providing the highest signal strength) and may use the provisioned network access credentials to connect to the selected access point. The client devices may know the IP address of the master controller and may route packets to the master controller over the network. The master controller may instruct the client devices to run various test routines and perform measurements and then provide the results to the master controller. Alternatively, client devices may automatically run test routines and report back to the master controller. The master controller or the user interface device may then generate a heat map or other reports characterizing network performance for the multiple access point network. The reports may indicate actions that a technician or user may take to optimize the network performance for the purposes for which the network and the devices communicatively coupled thereto are intended to be used.

BRIEF DESCRIPTION OF THE DRAWING FIGURES

Illustrative embodiments of the present invention are described in detail below with reference to the attached drawing figures and wherein.

Figure 2:
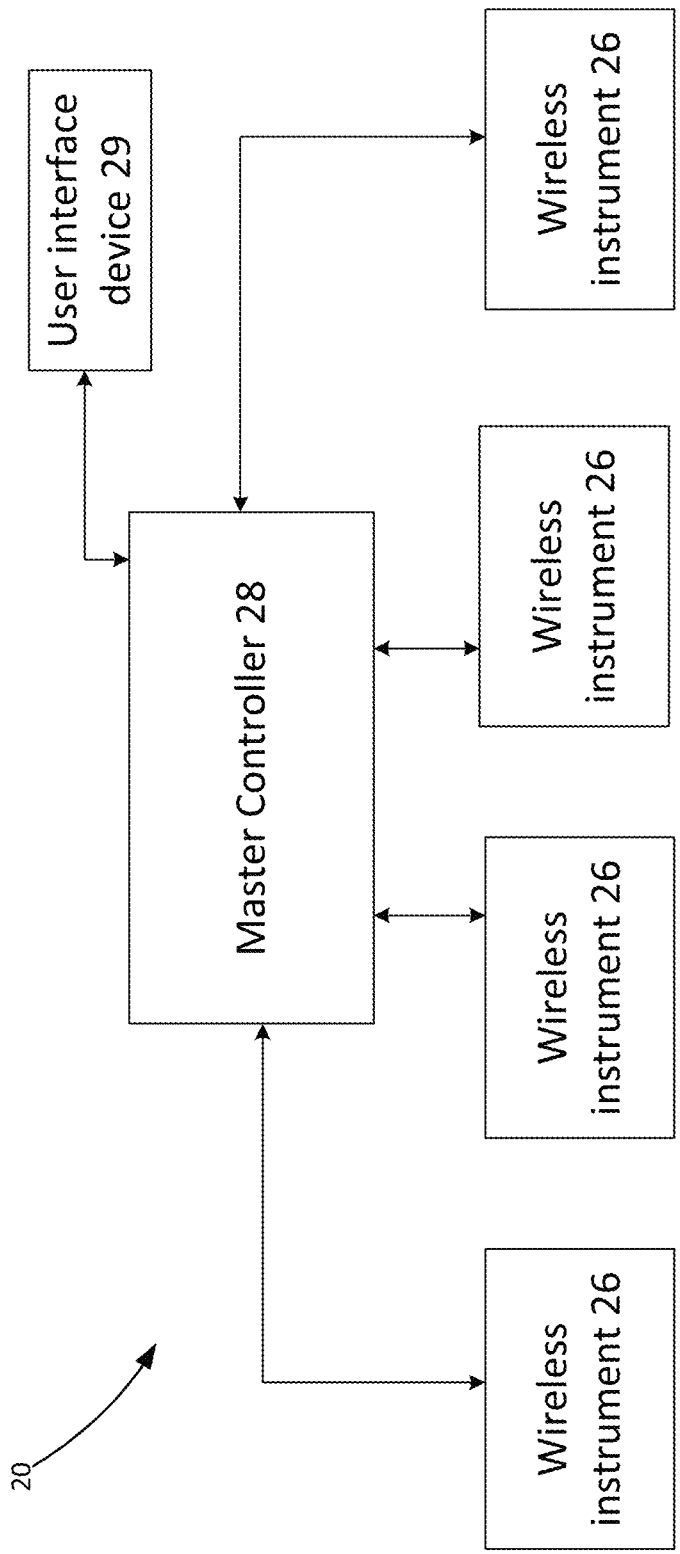
FIG. 2 is a schematic representation of a network testing and optimization system, according to an embodiment.
Figure 10C:
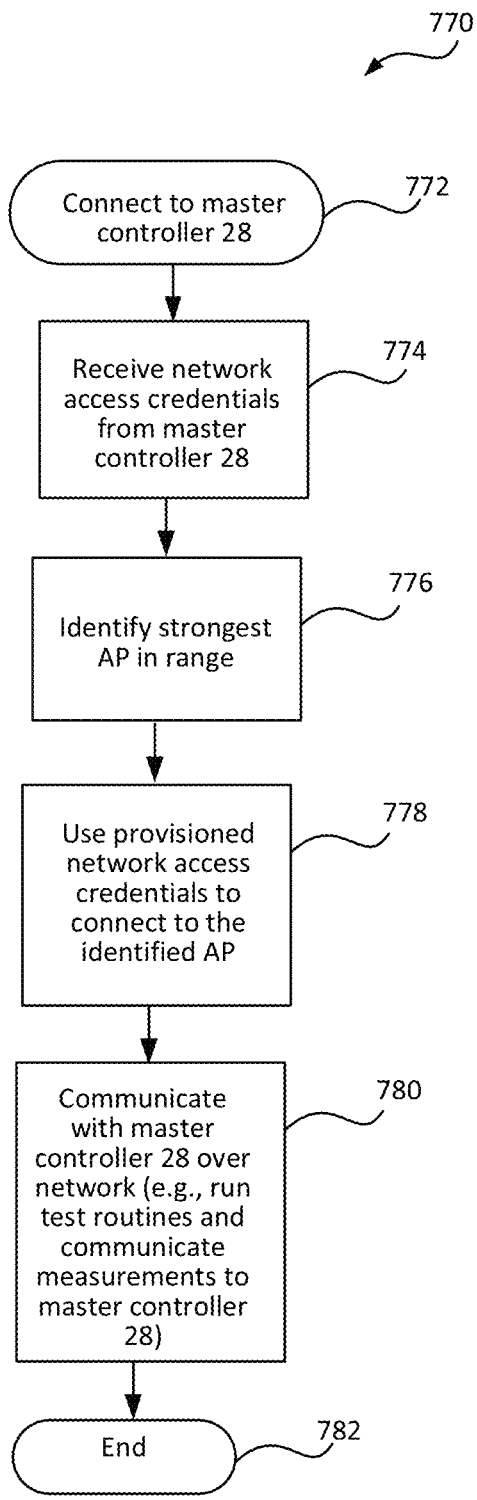

FIGS. 10A, 10B, and 10C are flowcharts that respectively illustrate the workings of a user interface device, the master controller, and one of the wireless instruments of the network testing and optimization system of FIG. 2, according to an example embodiment.

Figure 11:
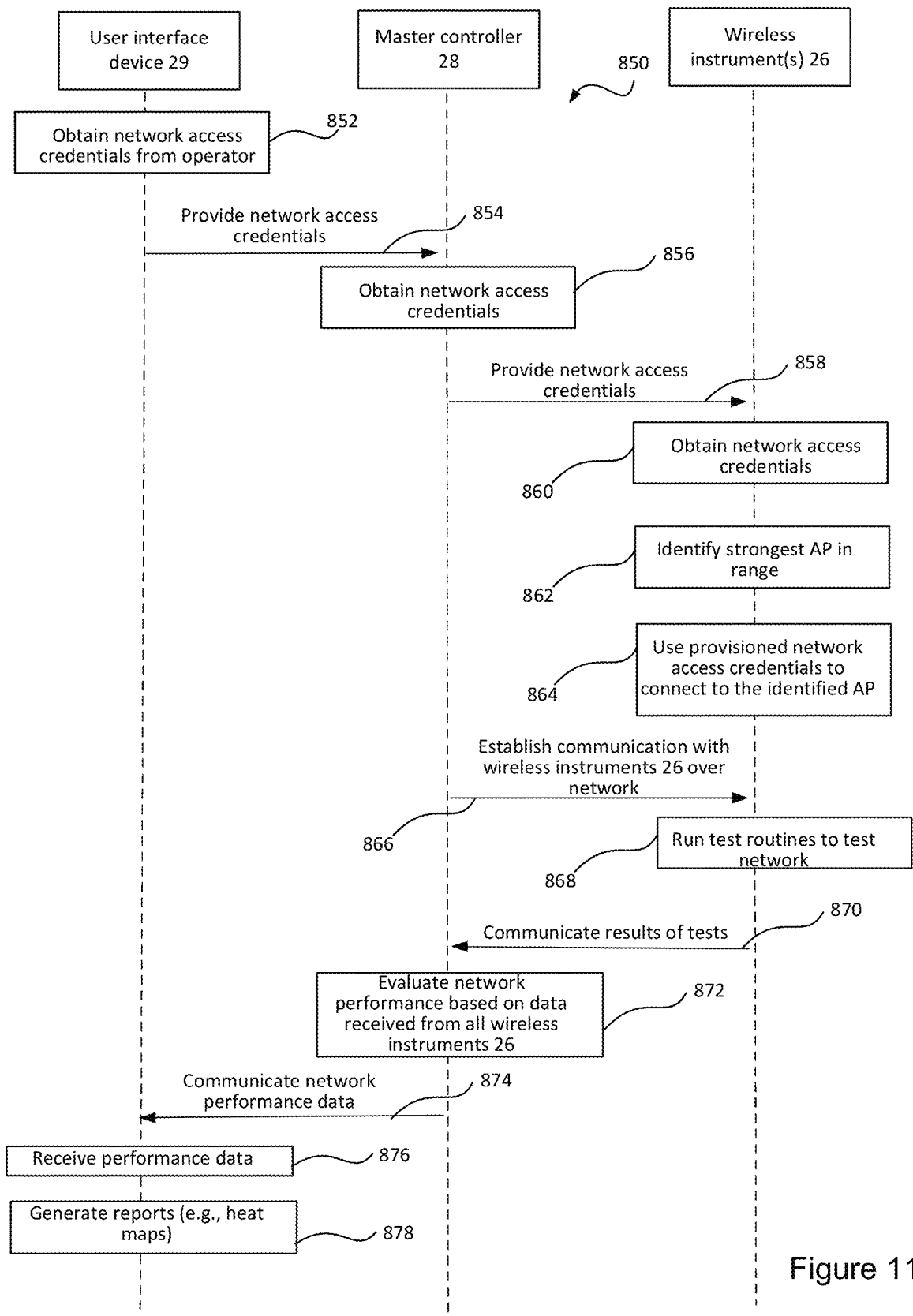

FIG. 11 is a signaling diagram according to an example method of using the network testing and optimization system, according to an embodiment.

Figure 12A:
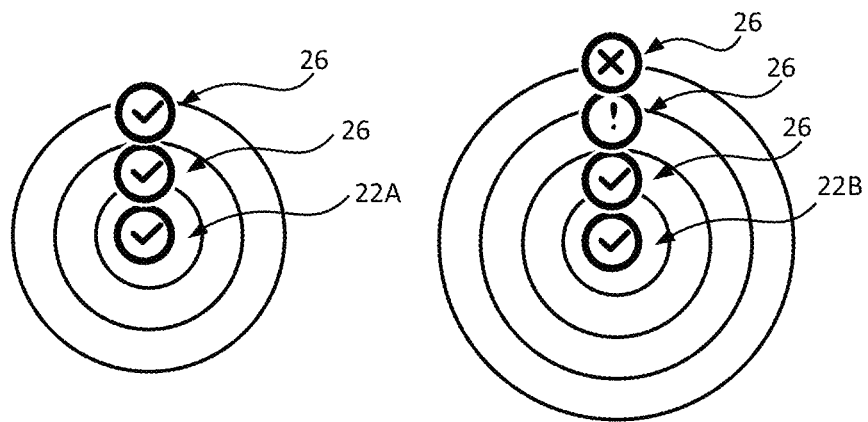
Figure 12B:
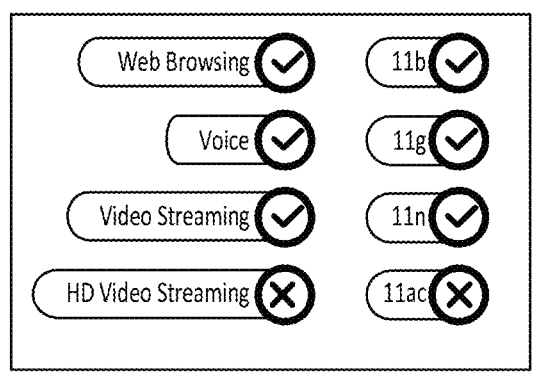

FIGS. 12A-B are example reports that the user interface may display based at least in part on information provided by the master controller and the wireless instruments to determine ideal placements of the gateways.

Figure 13:
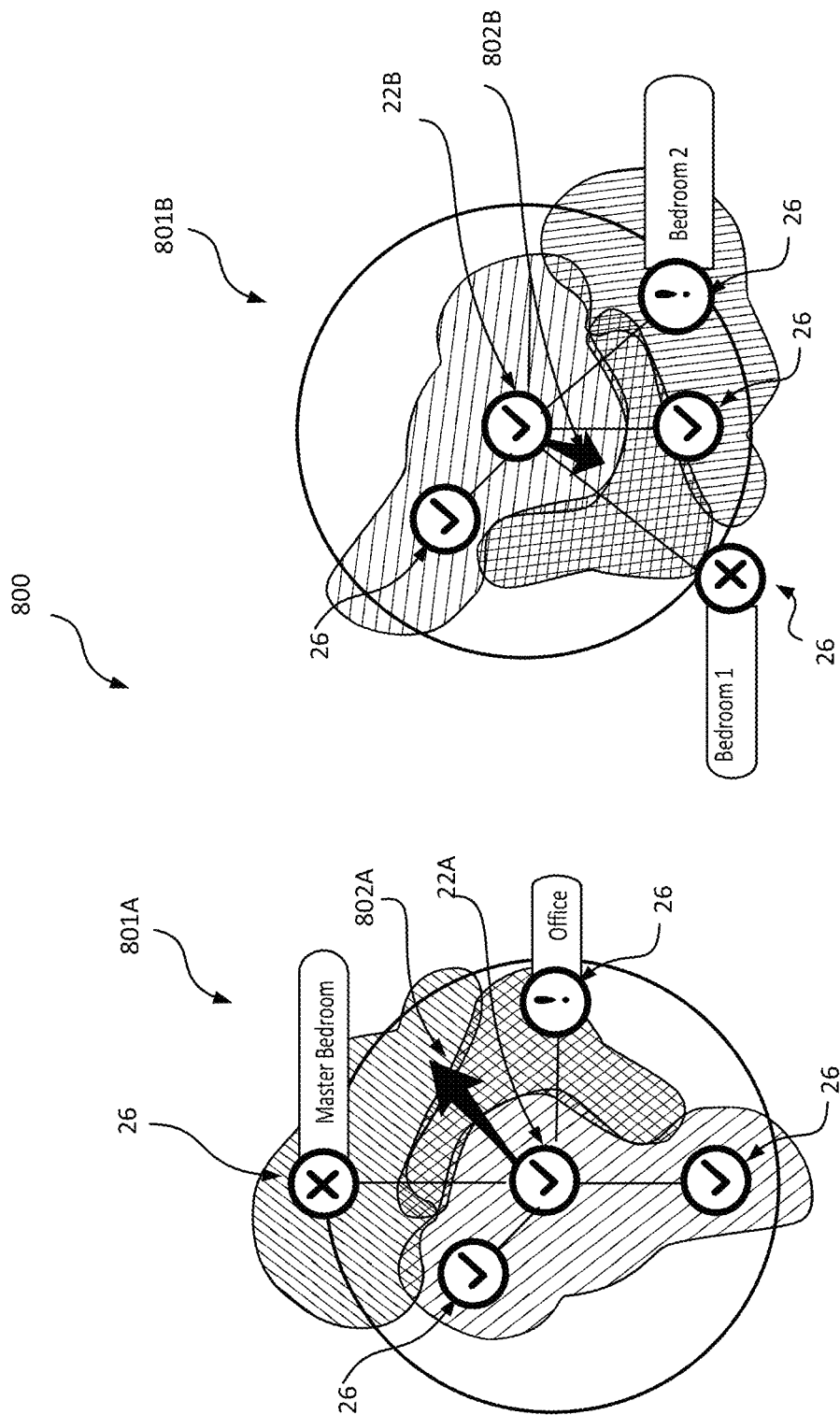

FIG. 13 is an example heat map report based at least in part on an analysis of interference, congestion and signal attenuation information received from the wireless instruments and master controller.

Figure 14:
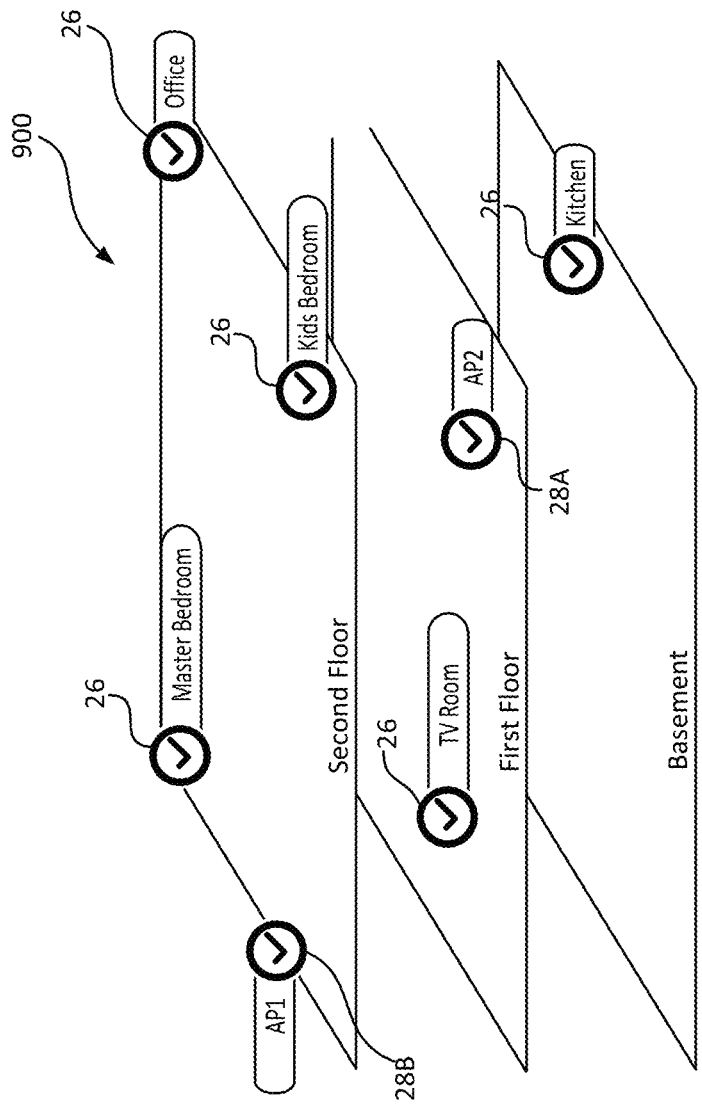

FIG. 14 is an example report illustrating a placement of the wireless instruments and access points in the environment and their status based at least in part on their placement.

Figure 15:
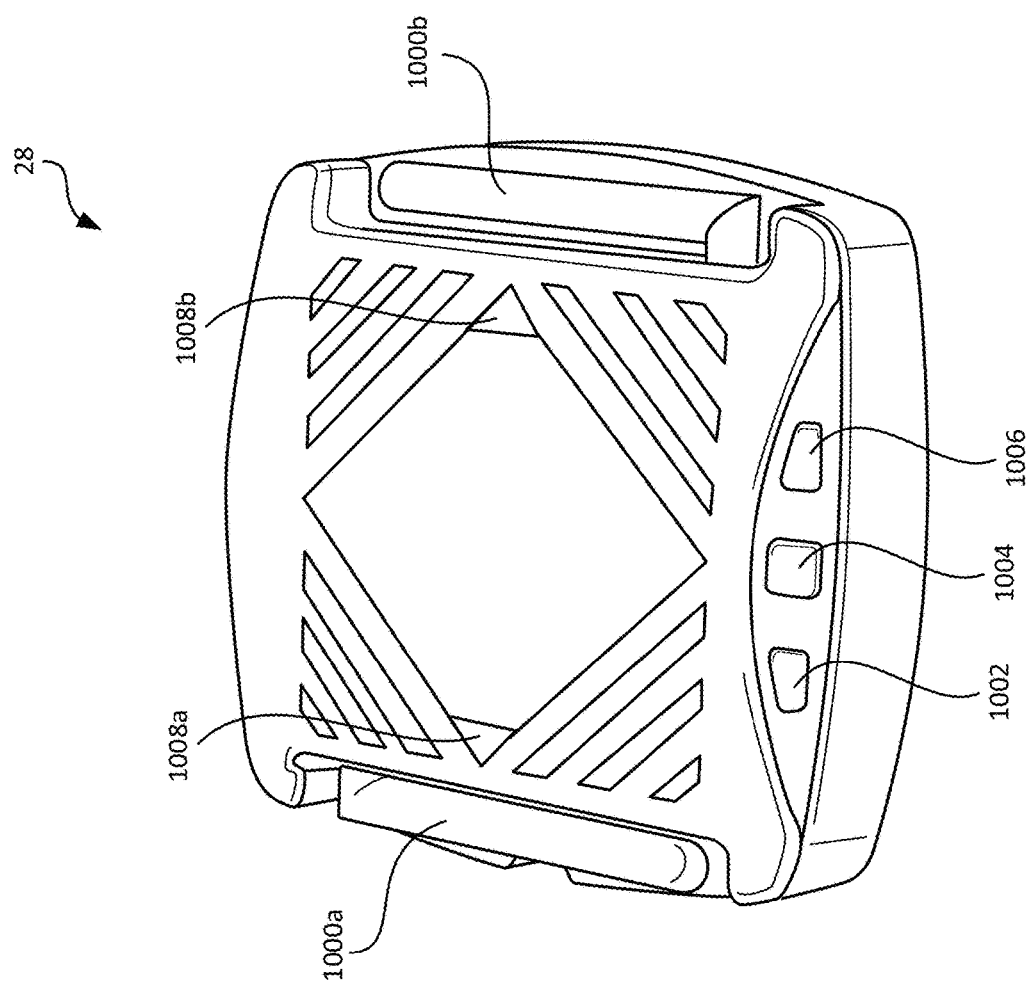

FIG. 15 is a perspective view of an example master controller.

Figure 16:
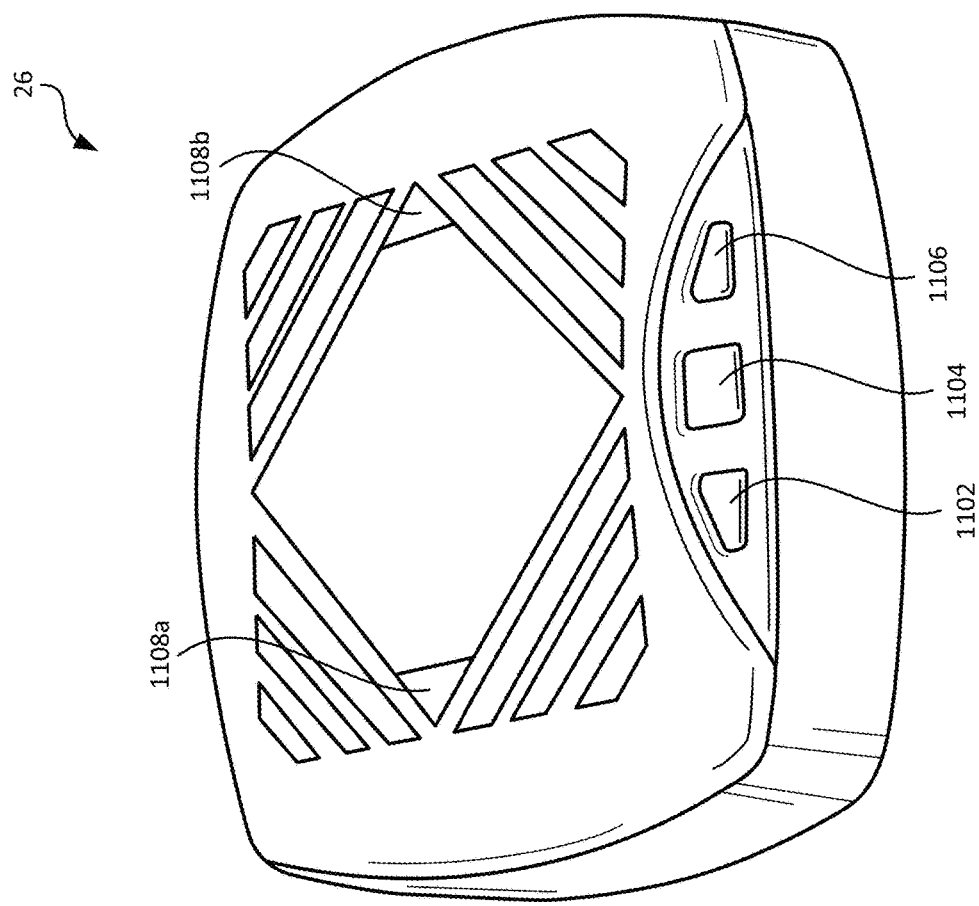

FIG. 16 is a perspective view of an example wireless instrument.

Figure 17A:
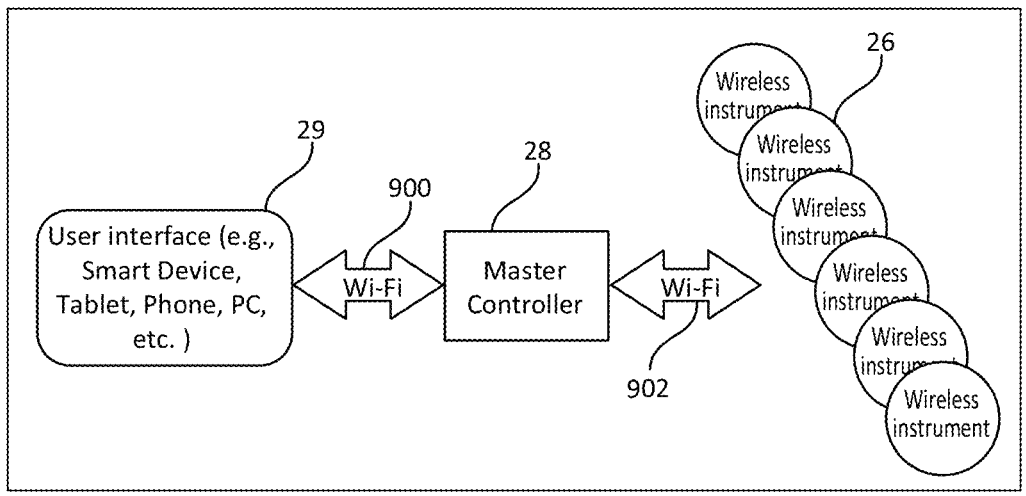
Figure 17B:
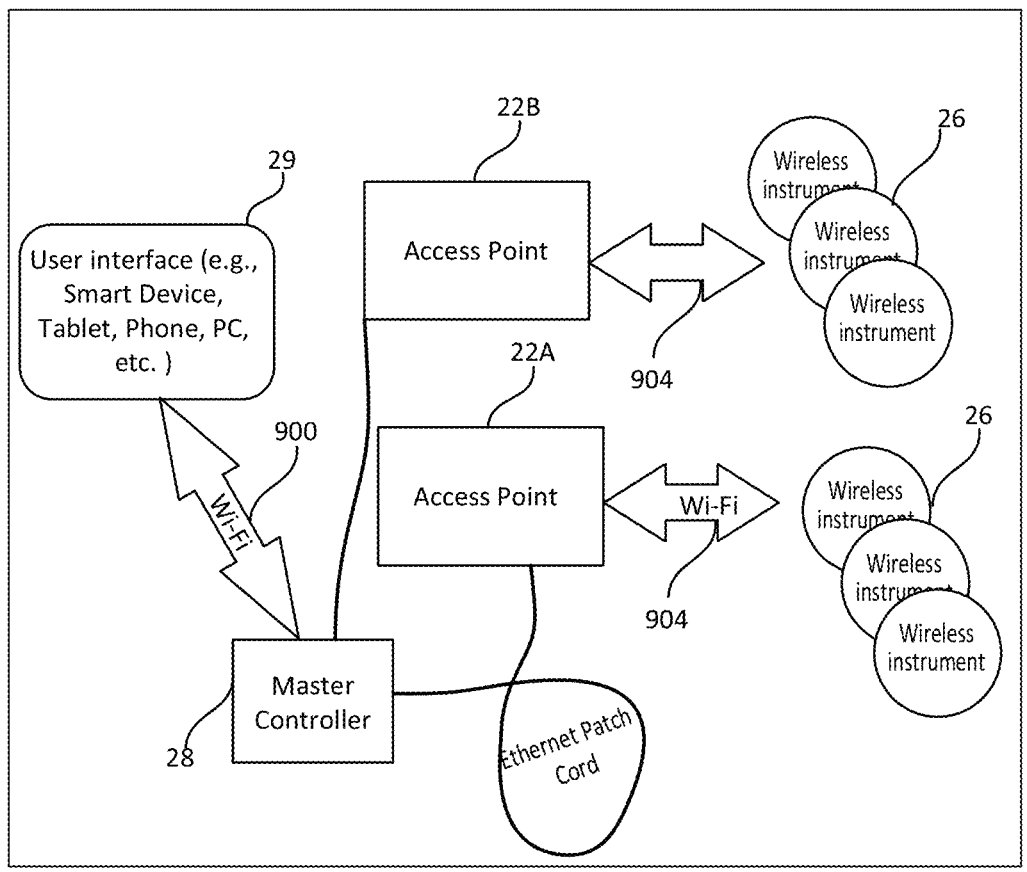

FIGS. 17A and 17B are block diagrams of example connections of the user interface device to the master controller, the gateways, and the wireless instruments.

FIGS. 18A-18H are example screen shots of a graphical user interface illustrating use of example methods to test the performance of a network having multiple access points in an environment.

DETAILED DESCRIPTION

The present disclosure is directed to systems and methods for testing and optimizing the performance of wireless networks. Specifically, the present disclosure is directed to the use of a distributed test system to analyze and optimize the performance of wireless networks, including wireless networks having multiple access points. The prior art solutions do not connect to and measure performance across multiple access points simultaneously; rather, test devices in prior art solutions connect to solitary single gateway or master controller. The systems and methods of the present disclosure allow for the testing and optimization of wireless networks that have two or more access points, and consequently, allow for better testing of network performance in larger buildings and other network environments in which multiple access points are deployed.

Figure 1:
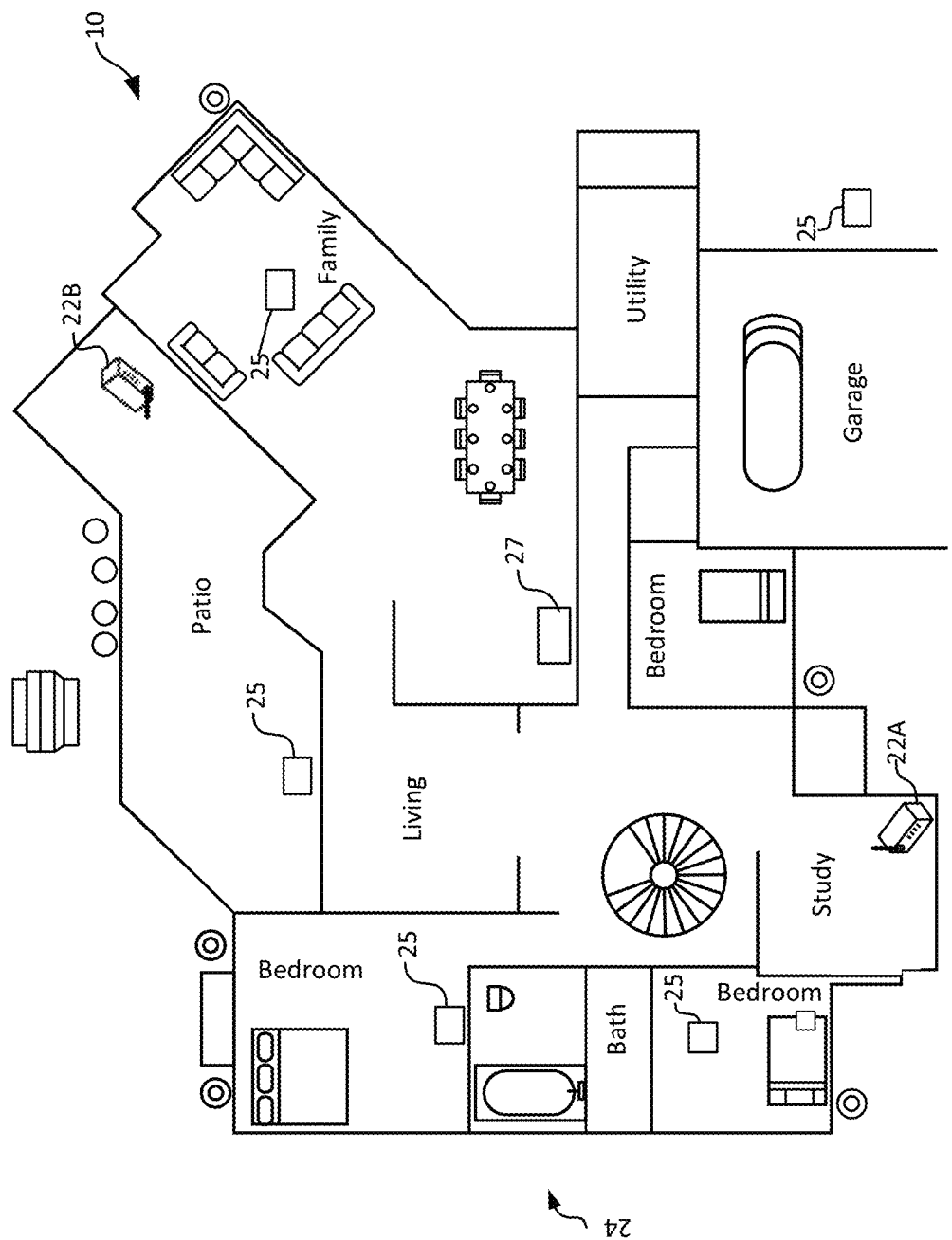
FIG. 1 is a top view of an example environment for determining wireless interference and congestion.

To illustrate the workings of the systems and methods of the present disclosure, focus is directed to FIG. 1, which shows an example environment 10 having an area 24 with a wireless network whose performance is to be determined and optimized. The area 24 may have, for example, a first access point 22A, one or more wireless devices 25 which employ the wireless network intermittently or continuously, and one or more existing devices 27. The environment 10 may, because of its large size, bandwidth requirements, or other considerations, include a second wireless enabled access point 22B which functions alongside the first wireless access point 22A to push the wireless network in the area 24. One of skill in the art will appreciate that an arbitrary number of access points can be used with the system.

The first and second access points 22A, 22B may furthermore be conventional wireless access points, wireless enabled gateways, routers, or other devices that allow the network to be accessed. In some embodiments, access points 22A and 22B operate on different channels within a given frequency band. For example, access point 22A may operate on channel 1 of the 2.4 GHz band, and access point 22B may operate on channel 6 GHz band. In those embodiments where a third access point is used, it may operate on channel 11 of the 2.4 GHz band and so forth.

One of skill in the art will appreciate that each wireless band (such as the 2.4 GHz band and the 5 GHz band) has a fixed number of channels. As such, for large deployment environments where many access points are needed, multiple bands may be used. For example, access points may be deployed on both the 2.4 GHz band and the 5 GHz band to maximize coverage without reusing channels (and thereby creating interference).

In other embodiments, the system of the invention can be used to plan a pattern of access point channel assignments to minimize inter-access-point interference. For example, in a homogenous, two-dimensional deployment environment, access points can be deployed in hexagonal grid. In such a grid, any three non-overlapping channels are sufficient to cover the deployment environment in such a way that no two adjacent access points share the same channel, providing a "buffer zone" between access points on the same channel equal to the radius of the hexagonal grid. In this way co-channel interference (i.e., interference between two transmitters on the same channel) can be minimized.

Of course, in practical deployments, signal propagation will not be perfectly uniform across the deployment area (due to, for example, walls and other obstacles), and using a uniform grid will not result in uniform coverage. Furthermore, the deployment area may be constrained with respect to access point placement. For example, if a school is deploying a wireless network, it may not be practical to place an access point on the centerline of the football field even if that would result in the best signal coverage.

In order to accommodate such real-world inhomogeneities, embodiments of the invention may adjust access point parameters such as channel assignments, transmit power levels, and access point locations based at least in part on constraints specified by the user. In the example above, the system may remove the proposed access point placement in the center of the field, add two additional access points on either side of the field and adjust the transmit power levels for the nearby access points to minimize interference while ensuring good coverage.

For example, in some embodiments, the deployment process can be started based at least in part on a blueprint of schematic of the deployment area. Initial access point placements may be proposed based at least in part on a homogenous grid adjusted for the walls depicted on the blueprint. A user may additionally override individual access point placements or entire areas (such as the above-described football field or other feature), based at least in part on deployment constraints making deploying an access point impractical. The system can then reposition, add, or delete access points to ensure that the entire deployment area is covered by at least one access point. Once a set of access point placements ensuring adequate coverage has been determined, the system can determine an initial set of transmit power levels (i.e., ranges) for the access point. For example, a Voronoi partition of the deployment area (based at least in part on distance or another metric such as estimated signal strength) can be calculated, and the signal strength for each access point assigned based at least in part on the distance from an access point to the furthest point in its Voronoi cell.

Finally, a channel assignment can be made for each access point. Different frequency bands and WiFi standards allow for different numbers of orthogonal channels For example, the 802.11b WiFi standard permits up to three orthogonal channels in the 2.4 GHz band, while the 802.11 g and 802.11N WiFi standards permit either three or four orthogonal channels (depending on the country of deployment). Channels may be assigned, where possible, such that to two adjacent access points use the same channel. Of course, this may not be possible, particularly in three-dimensional (e.g., multi-story) deployments. In such cases, the system may assign channels so as to minimize pairs of adjacent access points sharing the same channel.

One of skill in the art will further appreciate that performance in real world conditional may differ significantly from the simulated access point signal levels calculated as described above. As such, the real-world testing of devices, as described above) may be performed so as to determine actual signal strength throughout the deployment as compared to the computed estimated signal strengths. These tests may be performed throughout the deployment area at randomly sampled locations or at particular locations of interest. Such testing is described in greater detail below. Based at least in part on the results from the testing, access point parameters (such as locations, signal strengths, and channel assignments) may be recalculated to address dead zones, areas of low throughput or quality-of-experience, or excessive signal strength that might lead to interference.

Alternatively, the system may receive an initial set of access point deployment information representing an existing deployment and determine changes to improve the performance of the existing network by adding access points, relocating existing access points, or changing the parameters for existing access points. This may function similarly to the operation described above with respect to a new deployment and may further include a preference for leaving existing access points in place so as to avoid the reinstallation and rewiring associated with moving an access point. Thus, in such a scenario, the customer may prefer to add a new access point to address an area of low signal strength where (in a new deployment) a access point could instead simply be relocated.

Each wireless device 25 may be communicatively coupled (e.g., wirelessly) to one of the access points 22A, 22B so as to access the network. For example, wireless devices 25 that are closer to the first access point 22A relative to the second access point 22B may be in wireless communication with the first access point 22A, whereas wireless devices 25 that are closer to the second access point 22B as compared to the first access point 22A may be in wireless communication with the second access point 22B. Alternatively, the access point selected by a device may be that with the highest signal-to-noises ratio, the lowest utilization, or based at least in part on any other signal metric, disclosed herein or otherwise. The wireless devices 25 may be any device that the user wishes to communicatively couple to the network to exchange data thereover, such as a wireless set top box, a wireless laptop or desktop personal computer (PC), an Internet Protocol (IP) Video Security Camera, a wireless light controller, a wireless motion detector, wireless doorbells, other home automation device, wireless telephones, wireless enabled media devices, wireless home appliances, and so on. The existing devices 27 may be any device which exists within or near the area 24 and which broadcasts a wireless signal that is near or within and/or that may otherwise interfere with the wireless spectrum in which the access points 22A, 22B and wireless devices 25 are operating. The existing devices 27 may be, for example, microwaves, baby monitors, wireless enabled home appliances, wireless laptops, et cetera. While the environment 10 as shown in FIG. 1 is a house having one floor with various rooms, the artisan will understand that the environment 10 is not so limited, and may be any environment in which multiple access points are deployed, such as a two story house, a multi-story office building, et cetera.

Assume that a user (or technician) wishes to determine and optimize the performance of the wireless network within the area 24. Attention is directed now to FIG. 2, which shows a network testing and optimization system 20 for allowing the wireless network to be tested and optimized for the environment 10. The system 20 may have a master controller 28, one or more wireless instruments 26, and a user interface device 29, which collectively form a distributed network testing solution. The wireless instruments 26 and the user interface device 29 may each be in data communication with the master controller 28. In some embodiments, each of the wireless instruments 26 and the user interface device 29 may be wirelessly coupled to the master controller 28. In other embodiments, the user interface device 29 may be wired to the master controller 28, or may, for example, be configured as software code that is included in a memory of the master controller 28, as discussed herein. In other embodiments, the master controller 28 may be physically tethered to one or more of the wireless instruments 26 and the user interface device 29.

Figure 3:
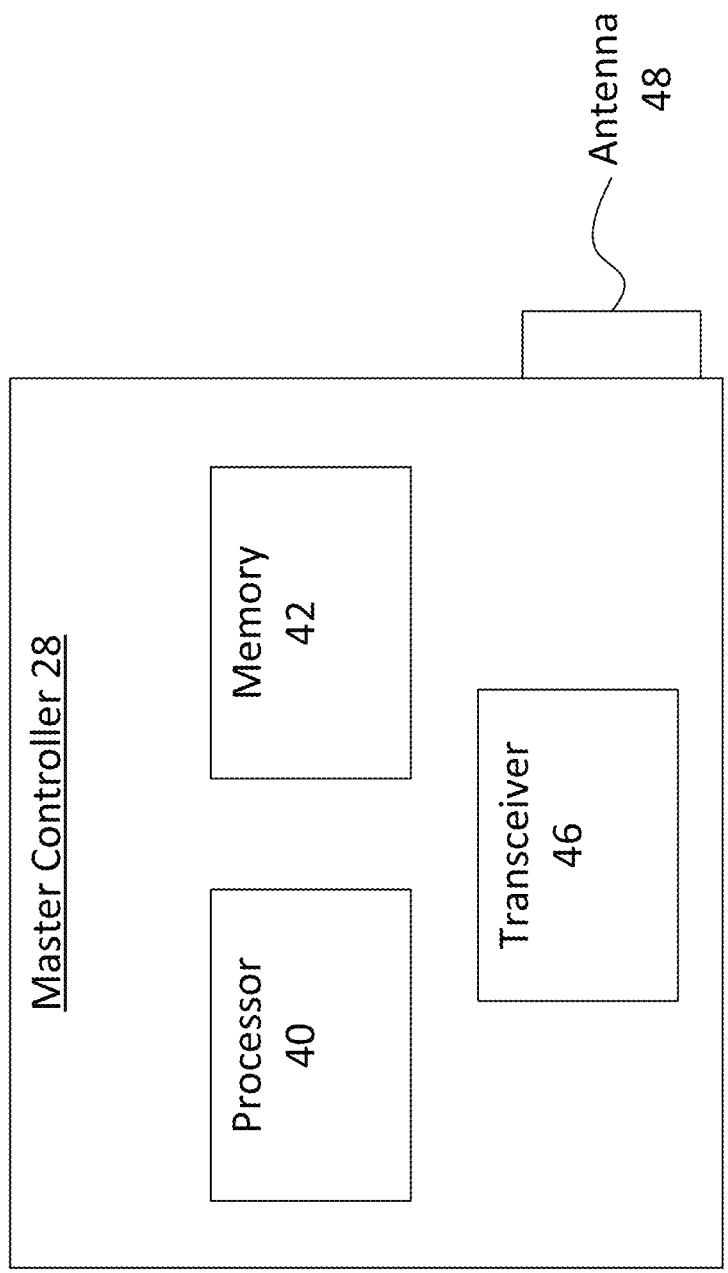
FIG. 3 is a schematic representation of a master controller of the system of FIG. 2.
Figure 4:
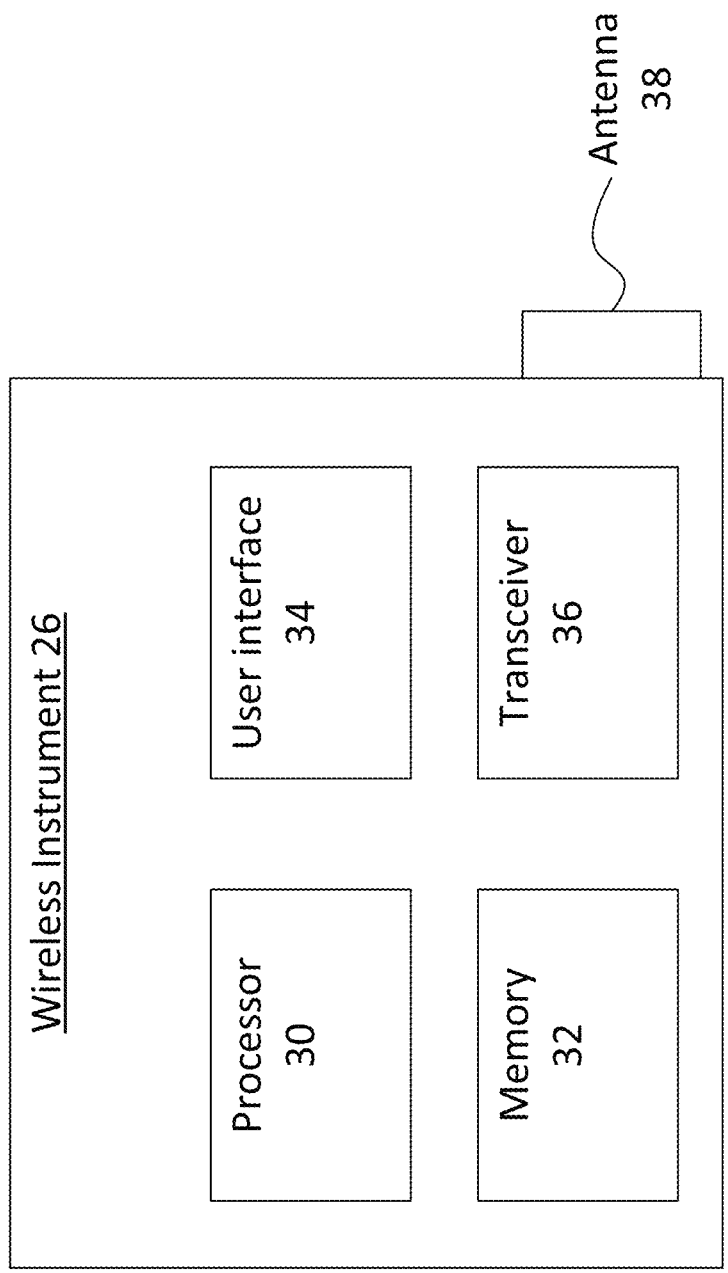
FIG. 4 is a schematic representation of a wireless instrument of the system of FIG. 2.

FIGS. 3 and 4 are block diagrams that schematically represent the master controller 28 and the wireless instruments 26 of the system 20 of FIG. 2, respectively. The master controller 28 (FIG. 3) may be a computing device, and may have a processor 40, a memory 42, a receiver or transceiver 46, and an antenna 48. The processor 40 may be in data communication with other components of the master controller 28, such as the memory 42 and the transceiver 46. In some embodiments, the processor 40 may include multiple processors. In some example embodiments, the processor 40 may be configured through particularly configured hardware, such as an application specific integrated circuit (ASIC), field-programmable gate array (FPGA), et cetera, and/or through execution of software to control the master controller 28 to perform functionality in accordance with the various example embodiments.

The master controller 28 may include communication hardware that allows the master controller 28 to send data to and receive data from the wireless instruments 26 and/or the wireless access points 22A and 22B. The communication hardware may include, for example, the receiver/transceiver 46, one or more antennas 48, and/or other appropriate hardware that may provide a communication interface for wirelessly sending and receiving information. The memory 42 may comprise non-transitory memory and may, for example, include embedded memory, an external memory card, and/or other memory devices. In some embodiments, memory 42 may include multiple memory devices, including various combinations of different types of memory. The memory 42 may include software code which, when executed by the processor 40, may cause the processor 40 and/or other components of the master controller 28 to collect information from the wireless instruments 26 relating to, for example, the strength of radio reception, the number of receivers on a channel, the signal strength of each channel that the wireless signal is being transmitted on, and radio interference from devices that share the radio frequency spectrum. The processor 40 may then analyze this information as described below.

The master controller 28, in some embodiments, may include and/or otherwise be in operative communication with a user interface device 29 (see FIG. 2). The user interface device 29 may be in data communication with the processor 40 and may allow for the inputting of instructions to the processor 40 of the master controller 28. The user interface device 29 may be implemented with a smart phone, tablet, laptop, PC, et cetera, that may be connected to the master controller 28 by way of a wireless and/or wired connection. In some embodiments, the functionality of the user interface device 29 may be incorporated into the master controller 28. For example, the master controller 28 may in some embodiments be provided with an input/output device, such as a touch screen, or a screen and keyboard, to allow for the provision of instructions to the master controller 28. In some embodiments, the functionality of the user interface device 29 may be incorporated into the wireless instruments 26.

FIG. 4 schematically represents one of the wireless instruments 26 of the network testing and optimization system 20 of FIG. 2. The wireless instrument 26 may, like the master controller 28, have a processor 30, a memory 32, and communications hardware such as a transceiver 36 and an antenna 38. The wireless instrument 26 may also include a user interface 34 to allow for the provision of instructions to the processor 30.

The processor 30 may comprise one or more processors. In some embodiments, the processor 30 may be configured through particularly configured hardware, such as an application specific integrated circuit (ASIC), field-programmable gate array (FPGA), et cetera, and/or through execution of software to control the wireless instrument 26 to perform functionality in accordance with the various example embodiments. The memory 32 may comprise non-transitory memory and may, for example, include embedded memory, an external memory card, and/or other memory devices. In some embodiments, memory 32 may include multiple memory devices, including various combinations of different types of memory. The memory 32 of each of the wireless instruments 26 may store the software which includes code that, when executed by the processor 30, causes the processor 30 (or wireless instruments 26) to perform the functions/methods described herein.

In more detail, the wireless instruments 26 may transmit and receive test wireless signals to and from the master controller 28, in order to analyze the existing radio environment and to determine the integrity of the wireless network and the amount of interference within the wireless spectrum on which the access points 22A, 22B and wireless devices 26 operate. The processor 30 of each of the wireless instruments 26 may also be configured, such as through execution of software and/or by way of hardware configuration, to collect and analyze data relating to the signal strength of a wireless signal, the number of receivers on a channel, the signal strength of each channel that the wireless signal is being transmitted on, transmission of data on an overlapping adjacent channel, radio interference from existing devices 27, and/or the like. The wireless instruments 26 may analyze the existing radio environment to identify wireless spectrum interference and build a graphical 'heat map' of the monitored area to indicate a coverage area and communication overlap for the wireless instruments 26 and the existing device 27, as discussed herein.

The user interface 34 of the wireless instruments 26 may be in communication with the processor 30, and may allow for the inputting instructions into the processor 30. The wireless instruments 26 may additionally include communication hardware for sending and receiving information to and from the master controller 28 and/or the access points 22A and 22B. The communication hardware may, for example, include a transceiver 36, one or more antennas 38, and/or other appropriate hardware that may provide a communication interface for wirelessly sending/receiving information.

In some embodiments, one or more of the wireless instruments 26 may be commercially available devices, such as smart phones, tablets, laptops or PCs with wireless capability, et cetera. The functionality of the wireless instruments 26 may be effectuated as a software application on such devices. the wireless instruments 26 may be further programmed to analyze the existing network environment having multiple access points at one or more locations over a continuous period of time and communicate with the master controller 28, as discussed in more detail below.

Figure 5:
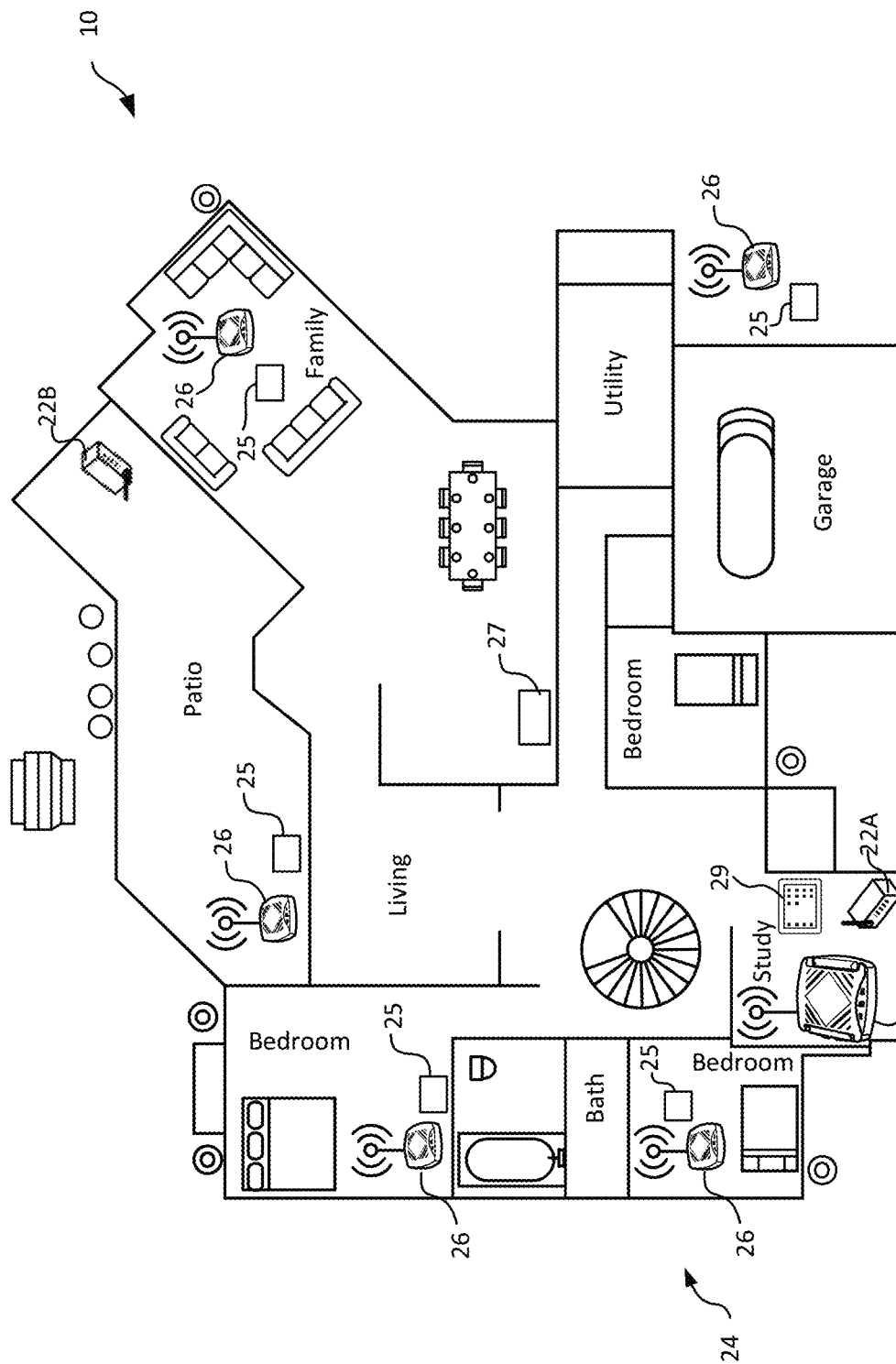
FIG. 5 shows the environment of FIG. 1 after the network testing and optimization system of FIG. 2 has been situated therein.

Attention is directed back to FIG. 1, and to FIG. 5. As noted above, FIG. 1 shows the environment 10, the area 24 of which includes the access points 22A, 22B and multiple wireless devices 25. FIG. 5 shows the environment 10 after the network testing and optimization system 20 has been set up therein. As can be seen, the master controller 28 may be situated proximate the wireless access point 22A. Alternatively, the master controller 28 may be situated proximate the wireless access point 22B, or at a different location within the environment 10. The master controller 28 may be used to determine the proper placement of the access points 22A and/or 22B, as discussed below.

The wireless instruments 26 may be placed proximate the wireless devices 25. For example, as illustrated in FIG. 5, a wireless instrument 26 may be placed proximate each wireless device 25 in the bedrooms, another wireless instrument 26 may be situated proximate the wireless device 25 in the patio, and yet another wireless instrument 26 may be situated proximate the wireless device 25 in the family room. The wireless instruments 26 may operate within the wireless spectrum to make radio frequency (RF) and low level signaling measurements while receiving and transmitting data encoded with wireless signals that is being transmitted or received within the that wireless spectrum.

More specifically, according to an example embodiment, the master controller 28 and the wireless instruments 26 may be programmed to emulate the capability and application traffic data patterns of the network in the environment 10. For example, if the wireless device 25 in the family room is a wireless enabled television, the wireless instrument 26 of the test system 20 situated in the family room may be programmed to simulate the television so as to analyze the interaction of the television with the network and other devices, including existing devices 27. Similarly, if the wireless device 25 in a bedroom is a wireless enabled laptop computer, the wireless instrument 26 placed in that bedroom may be configured to simulate the laptop computer. The user interface device 29 may send control commands to the master controller 28 which may in turn send commands to the wireless devices 26. The user interface device 29 may likewise receive information from the master controller 28 to, for example, determine congestion, interference, and/or signal strength in the environment 10, as described in more detail below.

In some embodiments, each wireless instrument 26 may be individually configured (e.g., via the dedicated user interface 34) to simulate the wireless device 25 is it intended to emulate. In other embodiments, the master controller 28, e.g., the user interface 29 in communication therewith, may be used to configure one or more of the wireless instruments 26 to emulate one or more of the wireless devices 25. In these embodiments, the user interface 29 may be utilized to cause the master controller 28 to send profiles to each of the wireless instruments 26 to indicate the type of wireless device 25 they are to simulate.

The profiles of the wireless instruments 26 may be robust. For example, if the wireless device 25 in one bedroom is a laptop that sees heavy network use (e.g., is used to consistently download videos over the network) but the wireless device 25 in the other bedroom is a laptop that uses network resources sparingly (e.g., is used only to check e-mail), the profiles of the respective wireless instruments 26 associated with these two laptops may account for such. When programmed without profiles, the wireless instruments 26 may obtain the minimum required bandwidth, and then use a multiplier of the minimum bandwidth to validate the performance of the networks under both normal and stressed conditions.

It will be appreciated that the network being analyzed and optimized may be any type of network, whether now known or later developed. For example, the wireless signals of the network being optimized may be transmitted at a frequency of 2.4 GHz, 3.7 GHz, or 5 GHz, for example, over any one or more channels. The artisan will readily appreciate that the network may be characterized as being within the IEEE 802.11 family of standards, such as the IEEE 802.11 (a/b/g/n), 802.11ac, 802.11ad, and/or other present or future developed IEEE 802.11 version for household or enterprise Wi-Fi capability and/or other present or future developed wireless networking technology that may be used for implementation of a wireless local area network.

In operation, the system 20 may, in addition to accounting for the wireless devices 25 via the wireless instruments 26, may also account for the interference, congestion, and other attributes of the signals that are generated by the existing device 27 within the wireless spectrum in which the wireless devices 25 and the access points 22A, 22B operate. The ability of a wireless network to operate reliably while moving vast amounts of data may depend on a variety of factors, including, for example, the strength of the wireless signal, the number of receivers receiving a wireless signal broadcast on a given channel, the number of transmitters on a given channel or overlapping channels, radio interference from devices that broadcast a wireless signal and/or share the same or similar radio frequency spectrum, broadband radio interference, and obstacles that break the line of site propagation of the wireless signal. The network testing and optimization system 20 may account for one or more of these factors when analyzing the workings of the network in the environment 10.

Figure 6:
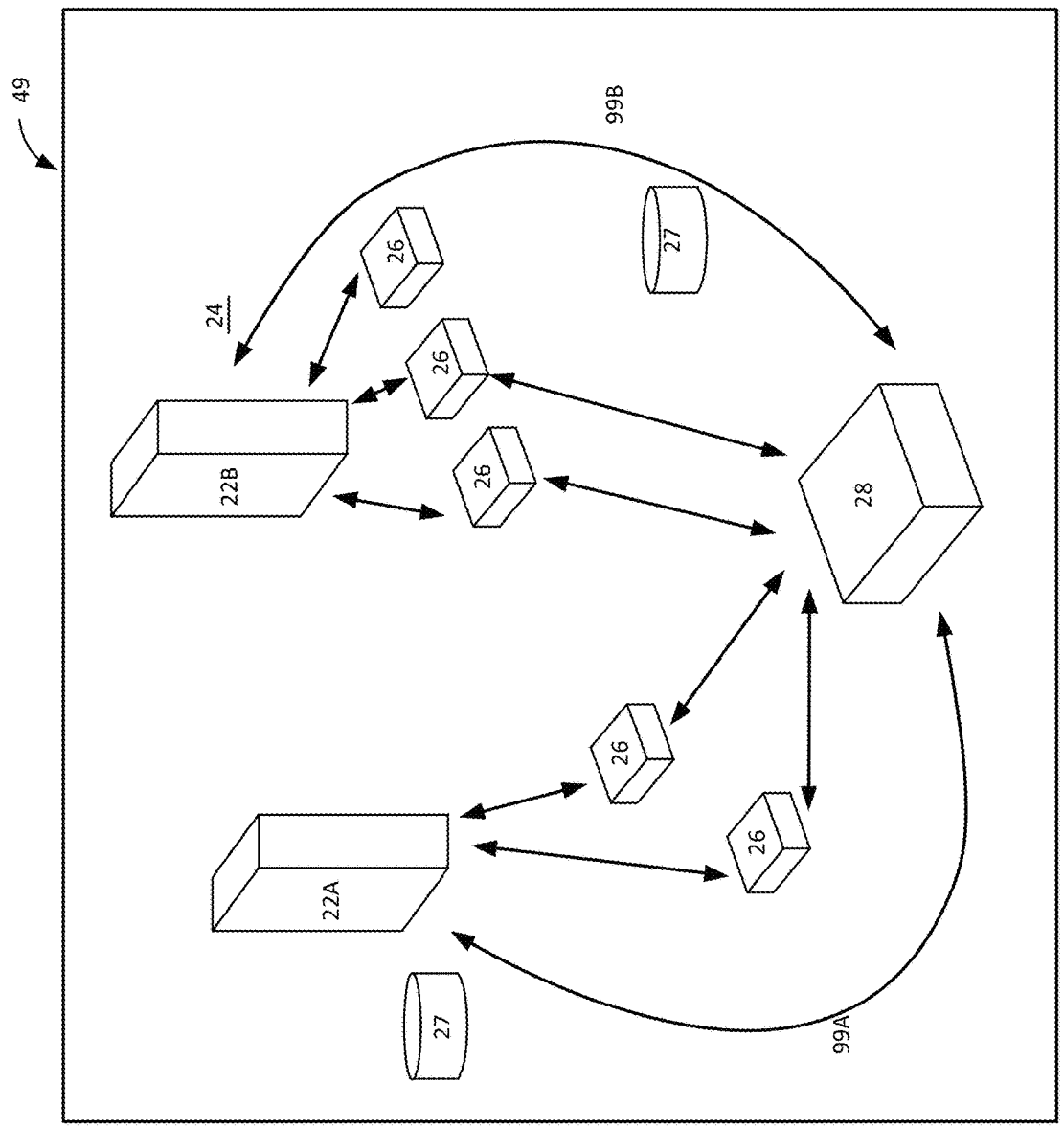
FIG. 6 is a block diagram of an example communication network implementing the master controller in the environment.

FIG. 6 is a block diagram of an example communication network 49 implementing the master controller 28 in the environment 10. The master controller 28 may connect and communicate wirelessly, e.g., via the access point to client network configurations 99A and 99B, with each wireless instrument 26 after each wireless instrument 26 is placed in the area 24. It will be appreciated, however, that other (e.g., non-structured) network configurations may be used, including, for example, an ad hoc network configuration. The processor 40 of the master controller 28 may be configured to analyze information received from the wireless instruments 26, and to send information to the wireless instruments 26, as described herein.

In some example embodiments, the functionalities of the master controller may be provided by a wireless enabled premise access point executing third party software, such as by Greenlee™ (a registered trademark of Greenlee Textron, Inc.) that may operate on one of a variety of operating systems, for example, Microsoft™ Windows, Apple™ iOS, Apple™ OSX, Google™ Android, or Linux™. When executing such software, the premise access point may be configured to perform functionality of a master controller in accordance with various embodiments disclosed herein. In other embodiments, the master controller 28 may be implemented by a commercially available device such as a smart phone, tablet, laptop or PC with Wi-Fi capability that may operate on one a variety of operating systems such as Microsoft™ Windows, Apple™ iOS, Apple™ OSX, Google™ Android, or Linux™. In this regard, the commercially available device may be configured through software to perform functionality of a master controller 28 in accordance with various embodiments disclosed herein.

The access points 22A and 22B may be computer networking devices that route packets of data encoded within the wireless signal from the wireless network to another network, typically a wired wide-area network (WAN). The access points 22A, 22B may communicate with the wireless instruments 26, with the master controller 28, the user interface device 29, and with the customer's wireless devices 25 which are to be powered later. Some wireless instruments 26 which are closer to the first access point 22A as compared to the second access point 22B may, as shown in FIG. 6, communicate with the first access point 22A. Similarly, wireless instruments 26 which are closer to the second access point 22B as compared to the first access point 22A may communicate with the second access point 22B instead of the first access point 22A. The artisan will appreciate that the first and the second access points 22A, 22B are merely illustrated and described by way of example, and that the system 20 may be utilized to test and optimize the performance of networks having any number of access points.

Figure 7:
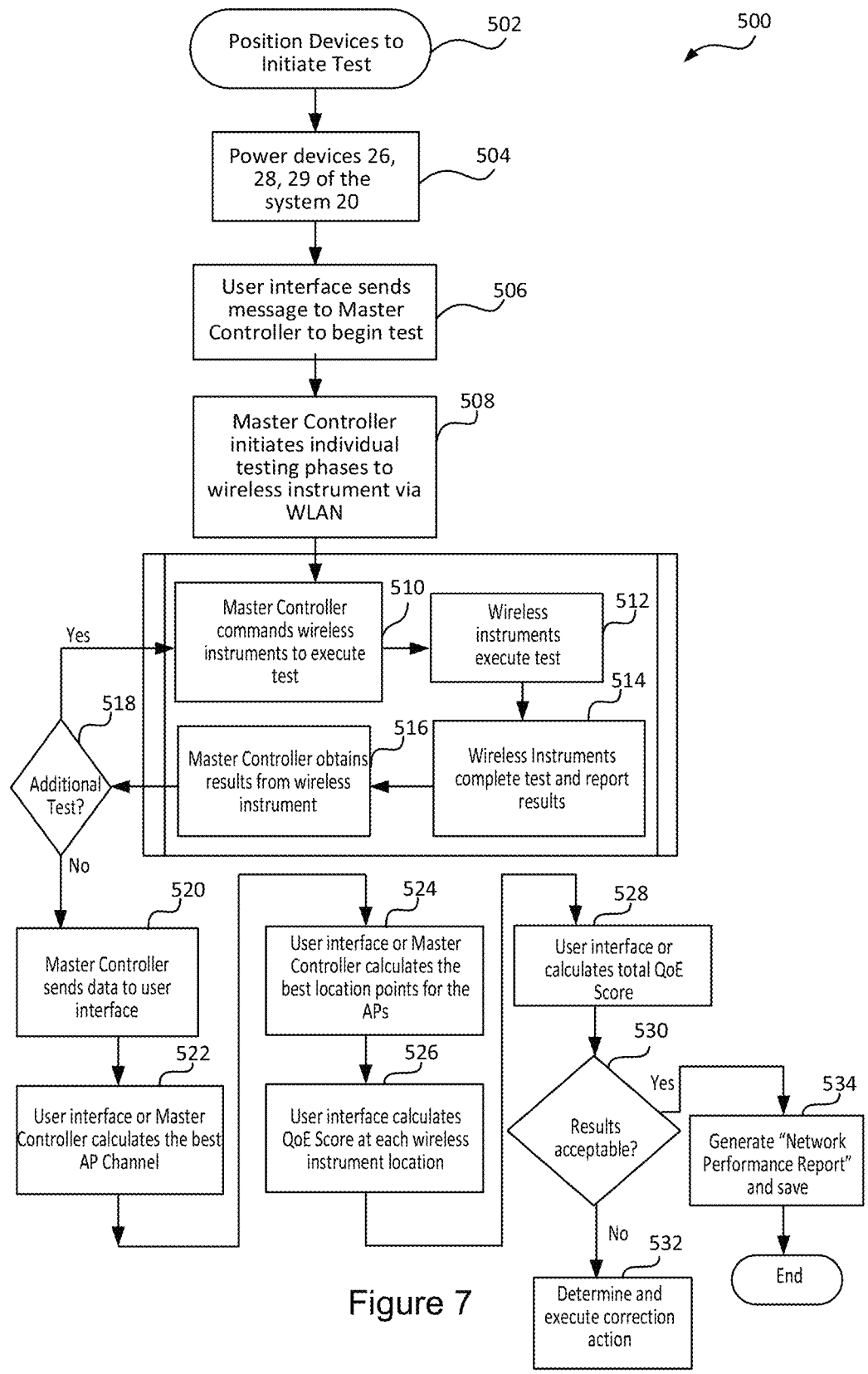
FIG. 7 is a flowchart of an example process for analyzing an RF environment to determine congestion, interference and/or signal strength.

FIG. 7 is a flowchart of an example process 500 for analyzing an RF environment, e.g., environment 10, to determine congestion, interference and/or signal strength. The process 500 may also apply to many other types of environments, e.g. commercial space, airports, schools, outdoor environments, vehicles, et cetera. The process 500 may identify possible communication problems in the environment 10, suggest potential resolutions to the problems, and set the customer's expectations. As described in more detail below, the process 500 may suggest preferred wireless (e.g., Wi-Fi) channels available for the environment 10, suggest preferred location(s) for the wireless Access Points, and/or provide a quality of experience (QoE) metric to set the customer's expectations.

The method 500 may begin at operation 502, where testing devices are positioned within the environment to analyze the workings of the network therein. For example, as discussed above, the master controller 28, the wireless instruments 26, and the user interface device 29 may be situated in the environment 10. The wireless instruments 26 may be placed at each location where the technician desires to characterize the wireless spectrum and simulate the performance of the wireless device 25 to be activated later. For example, the wireless instruments 26 may be positioned in the bedrooms, the family room, and the patio and next to the garage, for example, to replicate signals coming from wireless (e.g., Wi-Fi or WLAN) enabled devices such as wireless set top boxes, wireless laptops or desktop PCs, IP Video Security Cameras, wireless light controllers, wireless motion detectors, wireless doorbells, other home automation device, wireless enabled media devices, wireless home appliances, wireless telephones, baby monitors, et cetera, in the environment 10.

At operation 504, the test system 20 devices, including the master controller 28, the wireless instruments 26, and the user interface device 29, may be powered on or otherwise activated. Powering of the master controller 28 may activate its access point radio, thereby allowing the user interface device 29 and wireless instruments 26 to communicate with the master controller 28. The communication may be wired or wireless. The user interface device 29 of some example embodiments may include software, hardware and/or firmware to execute instructions for performing testing and analysis of the environment 10, in cooperation with the master controller 28 and wireless instruments 26. At operation 506, the user interface device 29 may send a command to the master controller 28 to initiate testing.

Each wireless instrument 26, when placed and turned on, may analyze the existing radio environment over a continuous period of time to characterize wireless (e.g., Wi-Fi) interference, congestion, and signal reach by analyzing the target spectrum, identifying radio interference, network disturbers, existing radio access points, channel allocation, and signal strengths of a portion of the area 24 within range of the wireless instrument 24. Once placed and turned on, as commanded by the master controller 28, the wireless instruments 26 may conduct interference, congestion, and signal reach measurements of wireless signals that would emanate from existing devices 27 at the specific points of placement. Each wireless instrument 26 may collect the information regarding interference, congestion, and signal reach, and the wireless instruments 26 may store the information in their respective memories 32. By understanding the wireless network capability, the user interface device 29 may predict how the radio frequency environment will behave, and the behavior of the environment may be used to determine a maximum data bandwidth that may be accommodated, e.g., for network performance.

At operation 508, based at least in part on a command from the user interface device 29, the master controller 28 may send commands to the wireless instruments 26 to initiate individual testing phases by the wireless instruments 26. The testing may comprise one or more of several tests.

One test may include parsing access point channels. The master controller 28 may command the wireless instruments 26 at operation 508 to parse the channel information from the beacon frames transmitted by visible access points and to determine what channel widths are supported by the visible access points. The wireless instruments 26 may execute the test by parsing the AP channel information for different channels at operation 512. The wireless instruments 26 may complete the test and report the results at operation 514. At operation 516, the master controller 28 may obtain the results from the wireless instruments 26, e.g., by receiving the reports sent wireless by the wireless instruments 26 to the master controller 28.

At operation 518, the master controller 28 may determine if additional tests should be conducted. In addition to parsing the AP channel information, additional tests, such as station analysis, may be used to measure the channel congestion. Congestion, also known as channel utilization, is a measurement of how busy the medium is with other competing wireless traffic. Measuring congestion may be a temporal phenomenon (e.g., high burst of traffic) during the evening hours in a residential setting or during the day in an office environment. Therefore, a more thorough measurement of congestion may be performed over an extended period of time, e.g., to detect daytime traffic, night-time traffic, traffic over a twenty-four hour period, traffic for the week, and/or traffic for a month, traffic over a year, etc.

The master controller 28 may also command the wireless instruments 26 to perform a packet capture and analyze the traffic to determine the number and types of stations connected to the APs to uncover local interference sources, e.g., a strong Wi-Fi TX device in the room, and discover additional clients and APs that the AP parsing scan did not discover, e.g., devices like thermostats, security cameras, etc. and video streaming devices like Apple™ TVs, Roku™ (a registered trademark of Roku, Inc.), Smart TVs, various other Internet of things (IoT) devices, and so on. The master controller 28 may also command the wireless instruments 26 to parse the IEEE 802.11k information. If an AP is IEEE 802.11k compliant, the wireless instruments 26 may parse the AP beacon information to obtain the number of clients connected to the AP and channel utilization factor.

The master controller, when conducting additional tests at operation 518, may also test channel usage. For conducting this test, the master controller 28 may command the wireless instruments 26 to perform a packet capture and analyze the traffic to determine the channel utilization based at least in part on packet length and data transmission rates. The master controller 28 may also command the wireless instruments 26 to check for transmission latency by measuring the time from when a packet is queued to when the packet arrives at the receiver. This may be used to measure the congestion in the air. The master controller 28 may likewise command the wireless instruments 26 to conduct retry analysis by performing a packet capture and analyzing the traffic to determine the percentage of traffic that is a retry. This may help determine if the congestion is due to excessive retries between devices. The master controller 28 may also command the wireless instruments 26 to check data rate distribution by performing a packet capture and analyzing the traffic to determine the data rate used between links. This may help determine if the congestion is due to devices using low data rates that consume too much medium time. The master controller 28 may further command the wireless instruments 26 to determine throughput by performing a throughput measurement and comparing the result with a reference measurement for an environment with no congestion. The throughput measurement may use a data pattern similar to streaming video, streaming audio, or web surfing services.

To measure non-Wi-Fi (or non-WLAN) interference, the master controller 28 may command the wireless instruments 26 to analyze receive sensitivity by transmitting a series of packets at predetermined transmit (TX) data rates to infer the environment's signal-to-noise ratio (SNR). The master controller 28 may command the wireless instruments 26 to check media access control (MAC) cycle counters. The radio's MAC hardware may include registers configured to count the number of clock cycles the MAC consumes when transmitting or receiving a frame and when processing other signals. The other signals may be considered non-Wi-Fi interference.

The master controller 28 may also command the wireless instruments 26 to determine a noise floor. A high noise floor may indicate that some sort of local interference is present. The noise floor may be measured over an extended period of time. The master controller 28 may command the wireless instruments 26 to check the physical layer (PHY) Error Counters. The radio's MAC may include counters configured to measure the number of PHY errors the RX engine is detecting while looking for WLAN (e.g., Wi-Fi) signals. The master controller 28 may further command the wireless instruments 26 to perform a spectrum analysis. New generation radios have a special mode that exposes low-level IQ values of the received packets in order to perform fast Fourier transforms (FFTs) and determine the type of interference that may be present in the environment.

To measure signal strength, the master controller 28 may command the wireless instruments 26 to determine the radio's reported received signal strength indicator (RSSI) of the beacon frames. The master controller 28 may also command the wireless instruments 26 to perform packet capture by analyzing RSSI of other types of packets, e.g., acknowledgement (ACK), probes. The master controller 28 may command the wireless instruments 26 to determine receive sensitivity by transmitting a series of packets at predetermined TX data rates to infer the environment's SNR.

The wireless instruments 26 may make RF and low level packet measurements and transmit and receive data in a manner that simulates the customer's wireless devices 27 or application bandwidth requirements. For example, the wireless instruments 26 in the family room may make RF and low level measurements and simulate a computer that is surfing the web, whereas the wireless instruments 26 in the kid's bedroom may simulate a baby monitor that is steaming audio. The family room may include audio and video electronic equipment, and the basement may include an access point, such as a gateway or router, et cetera; the wireless instruments 26 may make RF and low level measurements and may be instructed by the master controller 28 to transmit and receive signals so as to simulate devices or applications. Other such tests may likewise be conducted to better characterize the interference, congestion, and other signal issues.

At operation 520, after the tests are conducted to analyze interference, congestion, and signal issues separately and/or in coordination with the master controller 28, the wireless instruments 26 may transmit their results to the master controller 28 automatically, or a technician may utilize the master controller 28 to collect the information from each wireless instruments 26. As described in more detail in FIG. 8, the user interface device 29 and/or the master controller 28 may determine a preferred AP channel based at least in part on the information collected by the wireless instruments 26 at operation 522. The user interface device 29 and/or the master controller 28 may also determine at operation 524 a preferred location for each access point, e.g., for access points 22A and 22B, as described in more detail herein.

At operation 526, the user interface device 29 and/or the master controller 28, and/or the user interface 26 together with the master controller 28, may also determine a QoE score for each of wireless instruments 26, e.g., to record a quality of web browsing, voice, video steaming, high definition (HD) video streaming, et cetera, based at least in part on the position of the wireless instruments 26. A goal of the quality of experience QoE metric is to set the customer's expectations about the limitations of their RF environment. The QoE metric may be a weighted average of a collection of scaled measurements. For example, to compute the QoE for a particular room, such as a bedroom, the master controller 28 may employ the following equation:

$$QoEBedroom(S_{congestion}, S_{interference}, S_{signal}, S_{apps}) = W_{congestion} * S_{congestion} + W_{interference} * S_{interference} + W_{signal} * S_{signal} + W_{apps} * S_{apps}$$

Where:
Wx is the weight for parameter x (e.g., congestion, interference, and signal strength); and
Sx is the score for each parameter x.

Signal strength Ssignal may be computed as follows. It has been determined through testing that, in certain cases, the two measurements that provide the most accurate representation of signal strength are RSSI and SNR, where SNR is a slightly better indicator of signal strength that RSSI. The ranges for each scale may also be determined based at least in part on experiments and fine-tuned with the data collected during testing.

As an example, it may be determined that the weights of the RSSI and the SNR are 0.4 and 0.6, respectively, and that they represent the signal strength weight according to the ranges outlined below.

TABLE 1

| S | 0 if RSSI <90 |
|---|---|
|   | 1 if RSSI <80 |
|   | 2 if RSSI <70 |
|   | 3 if RSSI <60 or RSSI >40 |
|   | 4 if RSSI <65 or RSSI >45 |
|   | 5 if RSSI >65 and RSSI <45 |

TABLE 2

| S | 0 if SNR <5 |
|---|---|
|   | 1 if SNR <8 |
|   | 2 if SNR <11 |
|   | 3 if SNR <14 or SNR >30 |
|   | 4 if SNR <17 or SNR >20 |
|   | 5 if SNR >17 and SNR <20 |

In this example, signal strength Ssignal may be determined by using the equation: Ssignal=WRSSI*SRSSI+WSNR*SSNR, e.g., (0.4)(3)+(0.6)(5)=4.2. The QoE scores may be mapped per location of each wireless instruments 26 to provide a visual representation of the determined quality of experience for the customer at in each location.

The user interface device 29 and/or master controller 28 may also determine a total QoE score for the entire radio frequency environment 10 (e.g. a house, office, or other building) in similar fashion using a weighted average of all of the locations of the wireless instruments 26 at operation 526. For example:

$$QoEHouse=WP1*QoEP1+WP2*QoEP2+WP3*QoEP3+WP4*QoEP4.$$

In some embodiments, the weights, by default, may be the same for all room locations and may be averaged: W=1/(number of wireless instruments). The standard deviation may also be determined for the available QoEs and may be used to adjust the weight of the QoEs that fall outside, for example, one, two, or three standard deviations. Adjustment factors determined through trials may also be applied. A reason for this is that one or two rooms with bad QoE may have bursts of retries and/or use lower data rates. This may impact the available channel capacity for the other rooms when multiple rooms are playing at the same time. For example, a location with a QoEs of 4.5, 4.2, 3.8, and 2.5 results in an average QoE of 3.75. The standard deviation is 0.88 which results in the room with 2.5 falling out of one (1) standard deviation. In this case, the weight of this room may be adjusted from (0.25+0.10=0.35) and the other rooms down to (0.22). This results in a house QoE of 3.58. The master controller 28 may use such statistical analyses to further refine and improve the accuracy of the data obtained through testing.

Records of the QoE scores may be maintained so that customer service agents and technicians may refer the reports when a customer has a question about the communication performance of their environment 10. For example, the reports may indicate whether a particular room or area has sufficient network resources to allow for web browsing or video streaming, for example, or if updates to the environment will need to be made to allow for the web browsing or video streaming.

At operation 530, the master controller 28 may determine if the results of the tests conducted by the system 20 are acceptable, such as below or above a defined threshold or within a given range, e.g., above a defined QoE threshold or the like. In some embodiments, the master controller 28 and/or user interface device 29 at operation 530 may, in addition to or in lieu of determining whether the results are below a defined threshold, present the results to the user (e.g., present results that the user deems unacceptable). If the results at operation 530 are unacceptable (e.g., do not meet the requisite criteria such as a QoE threshold), the master controller 28 may determine (and in some embodiments, execute) corrective action. For example, if the testing shows that the results are inadequate, i.e., do not allow the user to use the network in the environment as desired, the master controller 28 may recommend (or the technician may infer) that a repeater and/or an additional AP needs to be added to the network, or, for example, that one or both of the access points 22A, 22B will need to be relocated. After corrective action is taken, the master controller 28 may reinitiate the testing at operation 508 based at least in part on the new configuration. If, on the other hand, the master controller 28 determines at operation 534 that the test results are acceptable, the master controller 28 (or the user interface device 29) may generate a network performance report and save same to its memory 42 for future reference. In some embodiments, the results may be saved on the cloud or in another database, and may be analyzed in the future. Such analytics may yield additional information to further refine and improve the testing processes. The method 500 may then conclude, and may be utilized to test other network environments in the same or similar fashion.

Figure 8:
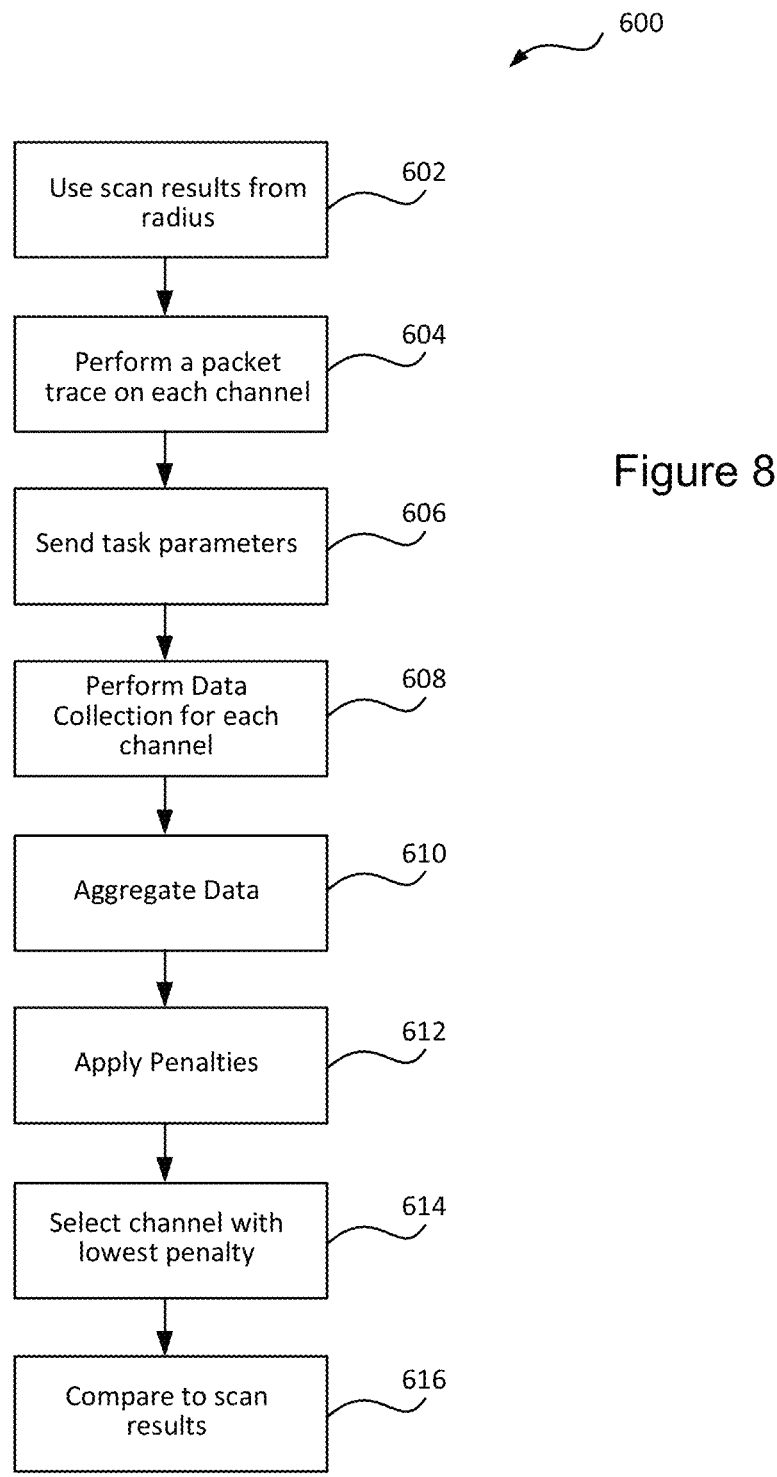
FIG. 8 is a flowchart of an example process for determining an optimal network channel.

As discussed above, at operation 522, the user interface device 29 and/or the master controller 28 may determine a preferred AP channel based at least in part on the information collected by the wireless instruments 26. FIG. 8 shows a method 600 for selecting the channel. At operation 602, using scan results from the AP radios, the number of APs in each channel is counted and the channel with the appropriate number of APs is picked. There may be a bias towards picking channels 1, 6, or 11 on the 2.4 GHz band. 5 GHz channels use a different band and there may be a bias towards picking different channels on the 5 GHz band. Depending on what the radio or operating system provides, a packet trace may be performed for a determined amount of time on each channel, e.g., by analyzing the IEEE 802.11k information inside the beacon at operation 64. The longer the dwell time is the more information may gather about the channel. After scanning each channel the packets are analyzed and stats collected. Once all the channels are scanned, the collected stats are processed and scored for each channel. A list of channels may be sorted based at least in part on the scores and the channel with the lowest score is selected.

The master controller 28 may send task parameters to the wireless instruments 26 associated with the environment 10 at operation 606. The task parameters may include a channel list, regulatory information (FCC requirements, for example), and a time to spend monitoring each channel. The wireless instruments 26 in the system perform a packet capture for each channel while sending broadcast probe requests at operation 608. As packets are received the following stats may be collected for each wireless instruments 26: source address, destination address, AP address (BSSID), AP name (SSID) for beacons and probes, signal strength (RSSI) distribution (min, max, average, median), data rate information (min, max, average, median), dissected information elements in beacons and probes, retry information, total medium occupancy (e.g., time computed based at least in part on packet length and data rate), and bandwidth measurements. The master controller 28 may aggregate the collected data from all devices at operation 610. Then a set of penalties may be applied to each channel based at least in part on the data collected as appropriate at operation 612. The channels with the lowest penalty may be selected by the master controller 28 at operation 614. To verify the channel selection, the channels selected by performing the packet trace may be compared to the channels selected by the scan at operation 616. The method 600 may thus find the preferred channel for the network for the access points 22A and 22B.

Figure 9:
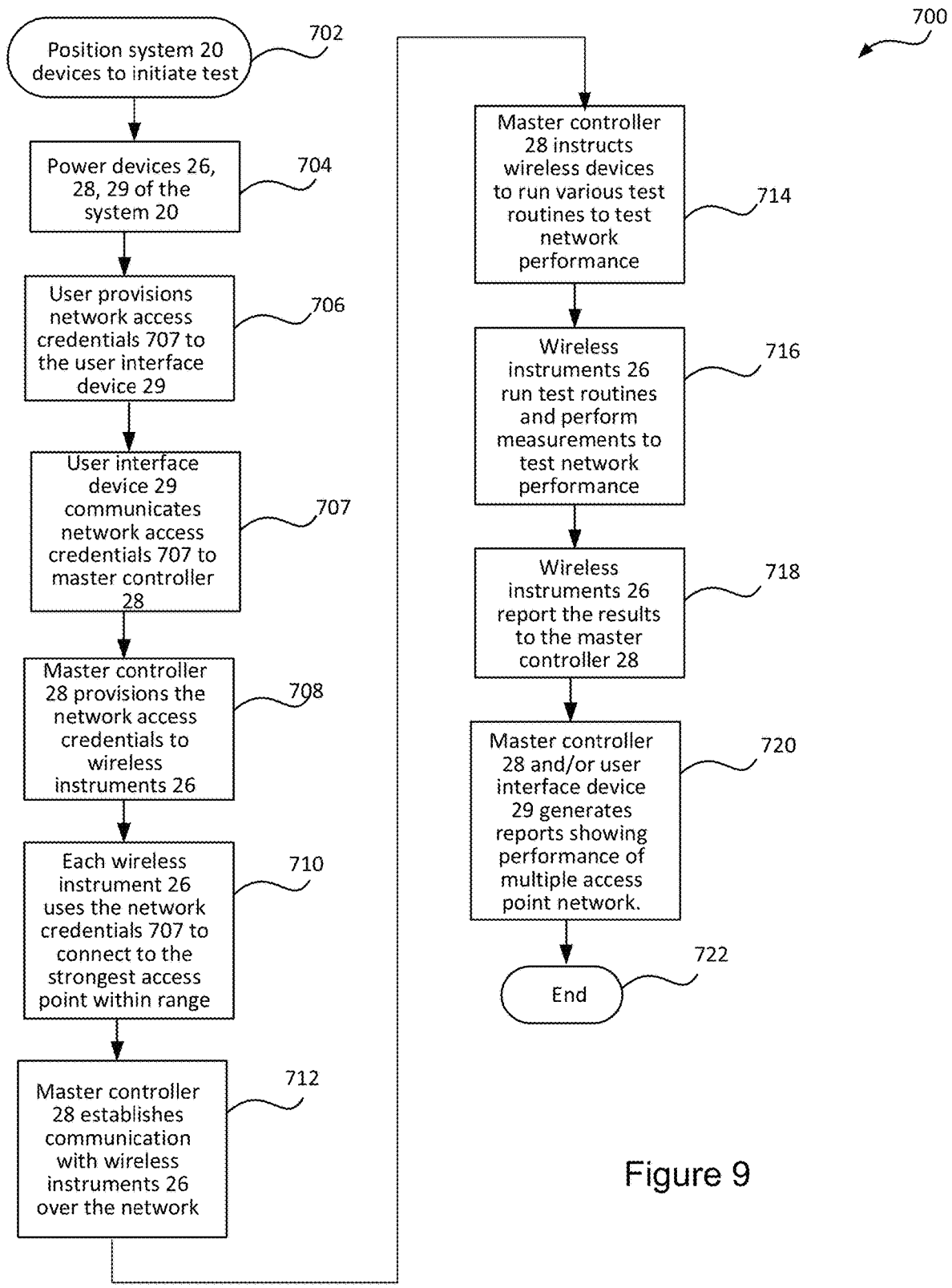
FIG. 9 is a flowchart of another example process of using the network testing and optimization system of FIG. 2 to test the performance of the network in the environment.

Another example method 700 of using the network testing and optimization system 20 to generate heat maps and/or other reports regarding network performance in the environment 10 is illustrated in FIG. 9. As noted, the environment 10 is merely an illustrative example, and the system 20 may be used in like fashion to test and optimize network performance in any network environment in which multiple access points are deployed.

At operation 702, the system 20 devices, such as the master controller 28, the user interface device 29, and the one or more wireless instruments 26, may be positioned in the environment 10. The master controller 28 may for example be situated proximate one of the wireless access points, or may be situated elsewhere in the network environment 10. The wireless instruments 26 may be distributed throughout the network environment 10. The user interface device 29 may be situated proximate the master controller 28 or elsewhere such that it is able to communicate with the master controller 28 (e.g., via a wired or wireless connection). In other embodiments, as discussed above, the functionality of the user interface device 29 may be encompassed by the master controller 28. The master controller 28 may also be communicatively coupled to the wireless instruments 26, such as wirelessly, via wired connection, et cetera.

At operation 704, the devices 26, 28, and 29 of the system 20 may be powered on. In some embodiments, one or more of the devices 26, 28, and 29 may be powered on prior to them being positioned in the environment 10.

At operation 706, a user (e.g., an operator of the system 20) may provide network access credentials 701 to the user interface device 29. For example, the user may input the network access credentials 701 into the user interface device 29 via an input device of the user interface device 29. At operation 707, the user interface device 29 may provision the network access credentials 701 it received from the operator to the master controller 28 which is in communication therewith. For example, the user interface device 29 may communicate the network access credentials 701 to the master controller 28 over a wired (or wireless) connection. In embodiments where the master controller 28 includes the functionality of the user interface device 29 (e.g., includes a touch screen or another input/output device), the network access credentials 701 may be input by the user into the master controller 28 directly. The network access credentials 701 may include, for example, a service set identifier (SSID), password, and/or other such information for allowing the network access points to be accessed. The master controller 28 may be connected to the network physically (such as via a switch, for example) or wirelessly. In some example embodiments, the network access credentials may be encrypted or otherwise securely protected when communicated to the master controller 28. In some example embodiments, protocols, such as Wi-Fi Protected Setup (WPS), that may be used to provision network access credentials between devices may be used to pass the network access credentials to the master controller 28.

At operation 708, the master controller 28 may provision the network access credentials 701 to the individual wireless instruments 26 to enable the wireless instruments to connect to the network. In some example embodiments, the network access credentials may be encrypted or otherwise securely protected when communicated from the master controller 28 to the wireless instruments 26. In some example embodiments, protocols, such as Wi-Fi Protected Setup (WPS), that may be used to provision network access credentials between devices may be used to pass the network access credentials to the wireless instruments 26. At operation 710, each wireless instrument 26 may use the network access credentials 701 provided by the master controller 28 to that wireless instrument 26 to connect to one of the access points. More particularly, each wireless instrument 26 may look for the strongest access point within range (e.g., the access point with the highest signal strength) and connect to that access point at operation 710 using the network access credentials 701.

At operation 712, the master controller 28 may establish communication with the wireless instruments 26 over the network. Alternatively, the wireless instruments 26, which are now coupled to the network, may establish communication with the master controller 28. At operation 714, the master controller 28 may instruct the wireless instruments 26 to run various test routines and perform measurements indicative of the network performance, as described in more detail herein. At operation 716, the wireless instruments 26 may run the test routines and perform measurements as instructed by the master controller 28. The wireless instruments 26 may know the IP address of the master controller 28 and may, at operation 718, report the results of the tests they performed to the master controller 28. In some embodiments, operation 714 may be omitted, and the wireless instruments 26 may automatically run the test routines at operation 716 and report the results to the master controller 28 at operation 718. At operation 720, the master controller 28 and/or the user interface device 29 may generate heat maps and other network data as described herein showing the performance of the multiple access point network. The method 700 may then end at operation 722.

Attention is directed now to FIGS. 10A-10C, which are flow charts illustrating the workings of the user interface device 29, the master controller 28, and the wireless instrument(s) 26 of the system 20, respectively, when testing the performance of a network having multiple access points, according to an example embodiment.

FIG. 10A shows an example method 730 of operation of the user interface device 29 of the system 20, when the system 20 is used to test and/or optimize a network environment. At operation 732, the user interface device 29 may obtain network access credentials 701 (such as an SSID, password, et cetera) from an operator, so that it could provide same to the master controller 28. At operation 734, the user interface device 29 may establish communication with the master controller 28 over the network. At operation 736, the user interface device 29 may receive the network performance data from the master controller 28. At operation 738, the user interface device 29 may generate and/or receive results of the tests, which results may include, for example, heat maps and other reports as outlined in more detail herein. The method 730 may then end at operation 740.

FIG. 10B shows an example method 750 of operating the master controller 28 when the system 20 is used to test the performance of a network having multiple access points. At operation 752, the master controller 28 may receive the network access credentials 701. For example, the master controller 28 may receive the network access credentials 701 from the user interface device 29 that is interfaced with the master controller 28. Alternatively, in embodiments where the master controller 28 encompasses the functionality of the user interface device 29, the master controller 28 may receive the network credentials 701 from the user directly at operation 752. At operation 754, the master controller 28 may provision the network credentials 701 to the wireless instruments 26 which are coupled (e.g., wirelessly or via wired connection) to the master controller 28. At operation 756, the master controller 28 may establish communication with the wireless instruments 26 over the network being evaluated. At operation 758, the master controller 28 may evaluate network performance based at least in part on data received from and communication with wireless instruments 26, as discussed in more detail herein. At operation 760, the master controller 28 may generate results, such as heat maps and other reports characterizing the performance of the network. The method 750 may then end at operation 762.

FIG. 10C shows a flowchart illustrating an example method 770 of using the wireless instrument 26 when employing the system 20 to test the performance of the network having multiple access points. The artisan will appreciate that while the operation of one wireless instrument 26 is detailed in FIG. 10C, that the other wireless instruments 26 that the system 20 comprises may function in generally the same way. At operation 772, the wireless instrument 26 may connect to the master controller 28. At operation 774, the wireless instrument 26 may receive network access credentials 701 from the master controller 28. At operation 776, the wireless instrument 26 may identify the strongest access point within range. At operation 778, the wireless instrument 26 may use provisioned network access credentials to connect to the AP it identified as having the strongest signal strength. At operation 780, the wireless instrument 26 may communicate with the master controller 28 over the network. For example, the wireless instrument 26 may run test routines and perform measurements and report results of same to the master controller 28. The method 770 may then end at operation 782.

Focus is directed now to FIG. 11, which shows a signaling diagram 850 illustrating the use of the user interface device 29, the master controller 28, and the wireless instrument(s) 26 of the system 20 to test the performance of a network having multiple access points. It will be appreciated that the signaling diagram 850 is provided here for the purposes of illustration only, and is not intended to be independently limiting.

At operation 852, the user interface device 29 may obtain network access credentials 701 (e.g., SSID, password, et cetera) from an operator of the system 20. At operation 854, the user interface device 29, which may be coupled to the master controller 28 via a wired or wireless connection, may furnish the network access credentials 701 to the master controller 28. The master controller 28 may, at operation 856, obtain the network access credentials 701. At operation 858, the master controller 28 may provide the network access credentials 701 to each of the wireless instruments 26, which may be in wired or wireless communication with the master controller 28. The wireless instrument(s) 26 may obtain the network credentials at operation 860. Each wireless instrument 26 may identify the strongest AP in its range at operation 862. At operation 864, each wireless instrument 26 may connect to the identified AP (e.g., the AP with the strongest signal strength) using the network access credentials 701 it obtained from the master controller 28.

At operation 866, the master controller 28 may establish communication with the wireless instruments 26 over the network and instruct the wireless instruments 26 to run various test routines and perform measurements to test the network. At operation 868, the wireless instruments 26 may run the test routines and perform the measurements as instructed by the master controller 28. Alternatively, once the wireless instruments 26 have identified the strongest AP and connected thereto, the wireless instruments 26 may automatically run such test routines without being instructed from the master controller 28 to do so.

At operation 870, each wireless instrument 26 may communicate the results of the one or more tests to the master controller 28. At operation 872, the master controller 872 may analyze the test results and measurements it obtained from the various wireless instruments 26 to evaluate the performance of the network as a whole. At operation 874, the master controller 28 may communicate the network performance data to the user interface device 29. The user interface device 29 may receive the network performance data at operation 876. The user interface device 29 may then generate reports, such as heat maps and other reports, as discussed in more detail herein. Additionally or alternatively, the master controller 28 may generate at least a portion of the heat maps and other reports and communicate same to the user interface device 29. In other embodiments, the master controller 28 may communicate the data it obtains from the wireless instruments 26 to the user interface device 29 which may analyze same to generate the reports characterizing the performance of the network having multiple access points.

FIGS. 12A-B are examples of reports that may be generated based at least in part on information provided by the master controller 28 and the wireless instruments 26 to determine proper placements of the access points 22A and 22B. The reports may, for example, be displayed by the user interface device 29 in accordance with some example embodiments. The wireless instruments 26 and master controller 28 may be configured to transmit beacons as described above. The master controller 28 may perform the channel selection scan. The scan list may include a list of devices (access points, e.g., gateways and routers, stations, master controllers 28, wireless instruments 26, etc.) in the area. The AP, e.g., master controller 28 acting as the AP and/or one of the access points 22A or 22B may placed in the middle of a virtual concentric circle. Each wireless instruments 26 that communicates with that particular access point 22A, 22B may be placed at a different outer circle based at least in part on at least one of the following: receiving signal strength indicator (RSSI), signal throughput, or QOE score, etc.

The results may include a checkmark indicator for a valid current location of the wireless instruments 26 and/or the access points 22A and 22B. For example, in FIG. 12B, a valid location of the wireless instruments 26 and/or access points 22A and 22B may indicate that the wireless instruments 26, as situated, may or may not perform their expected functions, such as one or more of web browsing, voice, video streaming, HD video streaming, and/or IEEE 802.11b, g, n, ac, etc., based at least in part on the congestion, interference and signal strength, etc. in the area 24. Additionally or alternatively, the position may be valid for web browsing but not HD video streaming (e.g., not enough throughput available) and IEEE 802.11ac (not enough SNR available), etc. An explanation point indicator indicates possible degradation of performance at that location, and an X indicates unacceptable performance at that location for the determined function, e.g., due to interference, congestion and/or signal attenuation. For example, the location is not valid for IEEE 802.11ac, but it valid for IEEE 802.11b, g and n. Other such reports may likewise be generated, as discussed for example in U.S. patent application Ser. No. 15/048,801 entitled Systems and Methods for Generating A Graphic Illustration of Wireless Network Performance, filed Dec. 19, 2016, the disclosure of which is incorporated herein by reference in its entirety. The reports may be based at least in part on the interference, congestion and signal reach, which may be determined as discussed above. The reports may indicate an optimal location for the wireless access points 22A and 22B.

FIG. 13 is a screenshot of an example heat map report 800 based at least in part on an analysis of interference, congestion, and signal attenuation information received from the wireless instruments 26 and master controller 28 for a network having a plurality of access points, such as access points 22A and 22B, each of which is situated at one of two floors 801A, 801B of a two story building. An ideal location for each of the access points 22A, 22B may be determined where the RSSI balances between each link. If placement of either of the access points 22A or 22B should be adjusted, the heat map may indicate a general direction in which the access point should be moved. For example, in FIG. 13, the heat map report for the first floor 8010A indicates that the access point 22A should be moved in a general direction 802A to improve the wireless network quality of service, particularly of the wireless instruments 26 in the master bedroom and the office (which wireless instruments 26 may, for example, be simulating a wireless enabled television and a wireless laptop that is placed in the master bedroom and the office, respectively). Similarly, a heat map report for the second floor 801B may indicate that the access point 22B should be moved in a general direction as indicated by the arrow 802B to improve the wireless network quality of service for the wireless devices 26 accessing the network through the access point 22B. The technician may provide name and location information when configuring the wireless instruments 26, e.g., master bedroom on first floor, bedroom 2 on second floor, et cetera, to improve the readability of the reports. For each location, interference and congestion may be determined for different signal types, e.g., web browsing, voice, video streaming, high definition (HD) video streaming, Wi-Fi channels, et cetera. The wireless instruments 26 may be able to simulate the capability of different Wi-Fi enabled devices and/or simulate traffic data patterns used by different applications such as streaming video, streaming audio, and/or web surfing services, etc.

FIG. 14 is another example report illustrating a placement of the wireless instruments 26 and master controller 28 in the environment 900 and their status based at least in part on this placement. The environment 900 may include multiple floors, e.g., a basement, first floor and second floor, etc. In this example, wireless instruments 26 are positioned in the TV room, master bedroom, office, kid's bedroom, and kitchen. One access point 28A, or other access point, is positioned in the basement, whereas another access point 22B is positioned on the second floor. The wireless instruments 26 may be tagged with labels to correlate the wireless instruments 26 to the representation displayed to the technician, e.g., master bedroom, office, kid's bedroom, TV room, kitchen, and access point access point 28A, 28B. The checkmark status may indicate that a performance based at least in part on the current positions of the wireless instruments 26 are meeting the minimum requirements for service, e.g., the wireless instruments 26 are able to perform their expected functions based at least in part on determined interference, congestion, and/or signal attenuation, etc. In this example, the wireless devices 26 on the second floor may access the network via the access point 28B, whereas the wireless devices 26 on the first floor and the basement may access the network via the access point 28A, and in some embodiments, this information may also be displayed for the technician. The performance may be illustrated for signal strength, signal-to-noise ratio, determined applications (e.g., Netflix™, Hulu™ (a registered trademark of Hulu, LLC), Pandora™ (a trademark of Pandora Media, Inc.)), et cetera. When the performance marker is clicked, additional details about the performance may be displayed, e.g., whether the position is individually acceptable or not for web browsing, voice, video streaming, HD video streaming, IEEE 802.11a, b, g, n, ac, ad, etc. For example, the position may be determined to be acceptable for video streaming and IEEE 802.11b but not IEEE 802.11ac.

The master controller 28 may provide (e.g., upload) to the user interface device 29 the analysis of the radio environment determined by each wireless instrument 26 revealing existing location risks. The technician may be apprised by the user interface device 29, e.g., smart phone, tablet, laptop, PC, etc., about the optimal locations for the placement of the wireless access points (e.g., access points 22A, 22B). From the data generated by the master controller 28 and the wireless instruments 26, the technician may infer if the first logical position for the wireless access points 22A and 22B meet the customer quality of service needs. If not the technician may move to the next best position as reported by the user interface device 29 for the wireless access points 22A, 22B and quickly repeat the process of validating the quality of service (QOS). Such an inference may be made, for example, by an analysis of the channels being used or the channels that have the most traffic when the technician selects the logical positions for wireless access points 22A, 22B, or by an analysis of the signal strength between the wireless instruments 26 and the master controller 28 when the technician moves between access point positions. When the master controller 28 is positioned in that optimal location, the master controller 28 may then be used to model the customer's wireless devices 25 using the wireless instruments 26, to validate the network's capability to deliver to the required quality of service.

After the optimal location is determined, the master controller 28 and the wireless instruments 26 may be left to operate so as to continuously analyze the existing radio environment to characterize the target spectrum and identify radio interference, network disturbers, existing radio access points, channel allocation, and signal strengths of the area being monitored. This may be performed over a period of time ranging from minutes to days. Because information is gathered over a period of time, the information may cause the pitfalls associated with the "snapshot" views to be avoided. Testing over a period of time makes it more likely that the testing accounts for all interfering devices, as there is a higher probability that all interfering devices will operate at some point during the extended testing period.

After the information is analyzed by the master controller 28, the access points 22A and 22B may be placed in the desired location. The master controller 28 may be connected to the access point 22A and/or access point 22B using a cable or wirelessly. Access point login information may be entered into the master controller 28 and passed to the wireless instruments 26. The wireless instruments 26 may drop their connection to the master controller 28 and connect to one of the respective access points 22A, 22B, based at least in part on their proximity to the access points 22A, 22B. The wireless instruments 26, in communication with the access points 22A or 22B, in coordination with the master controller 28, may validate the customer's actual wireless network performance and determine the maximum wireless network performance to ensure necessary delivered quality of service and determine future capability. The master controller 28 may generate an installation and validation report detailing the pre-deployment radio environment and the access point validation phase. This report, under the control of the installation team, may be provided to the customer and stored for later use. After it is determined that the access points 22A, 22B are properly positioned, the customer's devices 25 may then positioned in the area 24 and connected to the access points 22A, 22B for use.

Network degradation may occur after deployment and validation due to repositioning of an existing device 27, the addition of a device 27, broadband external noise or structural modification, or for other reasons. If a problem arises after the installation of the access points 22A, 22B, one or more wireless instruments 26 may be placed in the area indefinitely while connected to the customers access point to continuously monitor IEEE 802.11 (a/b/g/n), 802.11ac, 802.11ad, etc. environments. This may help ascertain the timing and cause of the network degradation. The wireless instruments 26 or the master controller 28 may build a long term, e.g., an hour, half a day, a day, a week, a month, a year, etc., interference and quality of service map which may be analyzed by the appropriate party to identify static and dynamic issues affecting the customer's quality of experience.

In some instances, the customer dictates (e.g., to the technician) where the access point 22A and 22B are to be placed, for example in an office and in a basement where the access points 22A, 22B are less likely to be seen. If the customer dictates the positioning of the access points 22A and/or 22B, the system 20 may be used to advise the customer of potential issues, such as lack of signal strength for a device 25 or interference with an existing device 27, with such placement. In this situation, if it is known that the placement presents an issue, an additional wireless access point may be provided to boost performance of those device 25. Additionally or alternatively, a wireless signal booster or repeater may be added to the environment 10 to improve performance.

FIG. 15 is a perspective view of an example master controller 28. It will be appreciated that FIG. 15 is provided by way of example, and not by way of limitation, such that other device form factors and selection and arrangement of user interface controls are contemplated within the scope of the disclosure. The master controller 28 may include external dual band antennas 1000a, b. The master controller 28 may include one or more buttons and/or other user input mechanisms, such as buttons 1102, 1104, and 1106. Button 1002 may be used to identify the master controller 28 for the user interface device 29 and button 1006 may be used to pair the master controller to the wireless instruments 26, for example. Button 1004 may be used to power the master controller 28 on and off. The master controller 28 in some embodiments may also include indicators lights 1008a, b to identify operation and power states. Additionally or alternatively, the master controller 28 may be implemented with a smart phone, tablet, laptop or PC, et cetera. For example, a software "application" may be loaded onto a smart phone to allow it to function to effectuate the purposes of the master controller 28 as set forth herein.

FIG. 16 is a perspective view of an example wireless instruments 26. It will be appreciated that FIG. 16 is provided by way of example, and not by way of limitation, such that other device form factors and selection and arrangement of user interface controls are contemplated within the scope of the disclosure. The wireless instruments 26 may include one or more buttons and/or other user input mechanisms, such as buttons 1102, 1104, and 1106. Button 1102 is used to identify the wireless instruments 26 for the user interface device 29. Button 1106 may used to pair the wireless instruments 26 to the master controller 28. Button 1104 may be used to power the wireless instruments 26 on and off. The wireless instrument 26 may also includes indicators lights 1108a, b to identify operation and power states. Additionally or alternatively, the wireless instruments 26 may be implemented with a smart phone, tablet, laptop or PC, et cetera.

FIGS. 17A and 17B are block diagrams of example connections of the user interface device 29 to the master controller 28 and wireless instruments 26. In FIG. 17A, to test the environment 10, the user interface device 29 sends commands to the master controller 28, e.g., via a WLAN connection. It will be appreciated that the illustration of a wireless connection between user interface device 29 and master controller 28 is provided by way of example, and not by way of limitation. In this regard, other types of connections may accommodate communication between the user interface device 29 and the master controller 28, whether wireless or wired, within the scope of the disclosure. The master controller 28 may communicate with the wireless instruments 26 with a Wi-Fi connection 902. Other types of connections may accommodate communication between the master controller 28 and the wireless instruments 26, whether wireless or wired.

In FIG. 17B, during a verification process of a wireless quality of the environment 10, the access points 22A, 22B, or other customer AP, may be connected with the master controller 28 via wires, e.g., an Ethernet patch cord. The access points 22A, 22B may communicate with the wireless instruments 26 via Wi-Fi or other connection. In some embodiments, the master controller 28 may be coupled to the access point 22A in a wired manner and may communicate with the access point 22B wirelessly.

FIGS. 18A-18H are example screen shots of a graphical user interface illustrating use of example methods to test the performance of a network having multiple access points in an environment. The artisan will appreciate that the screen shots of the GUI are examples only, and that the GUI is not intended to be limited to the screen shots shown.

Figure 18A:
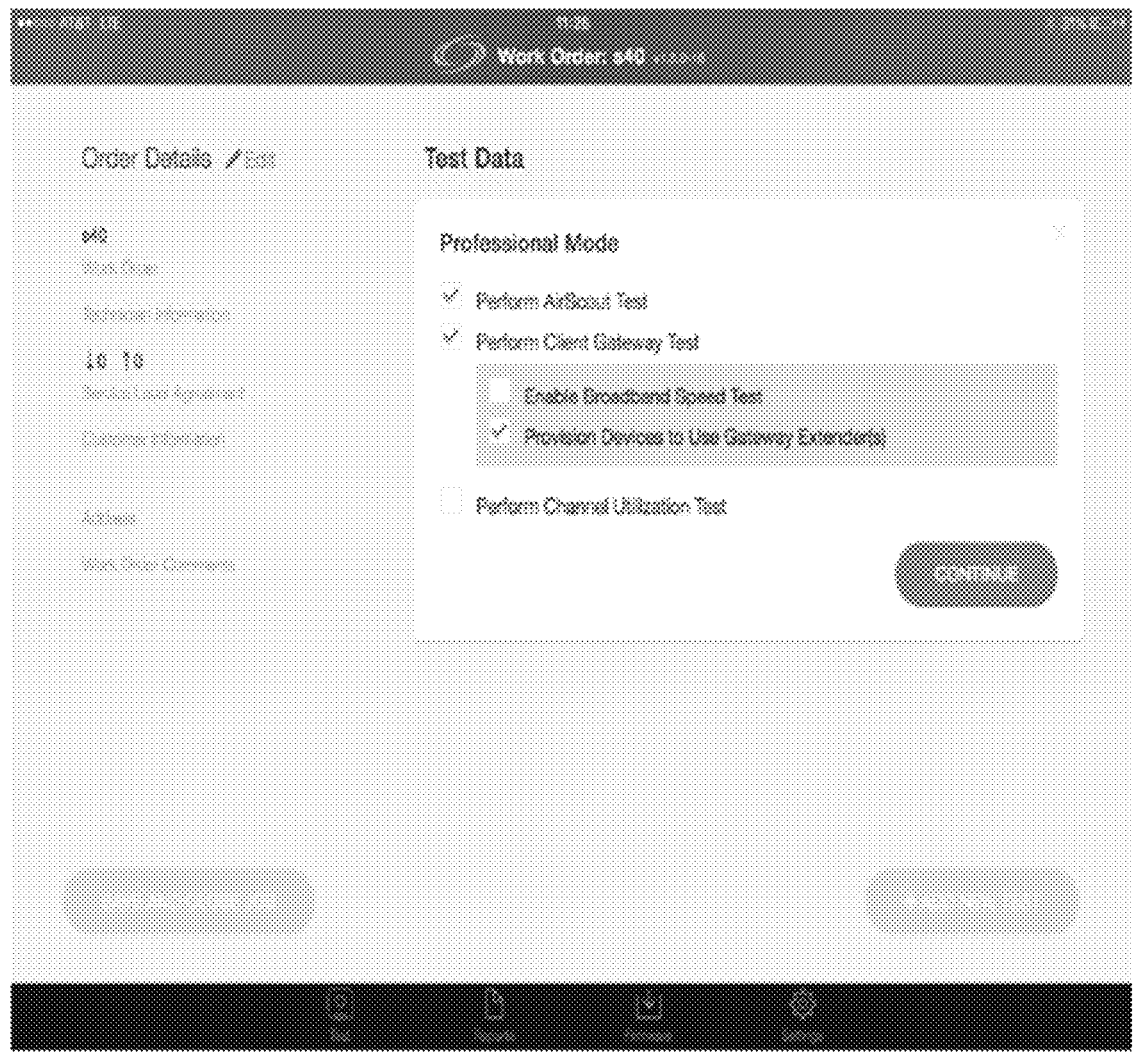
Figure 18B:
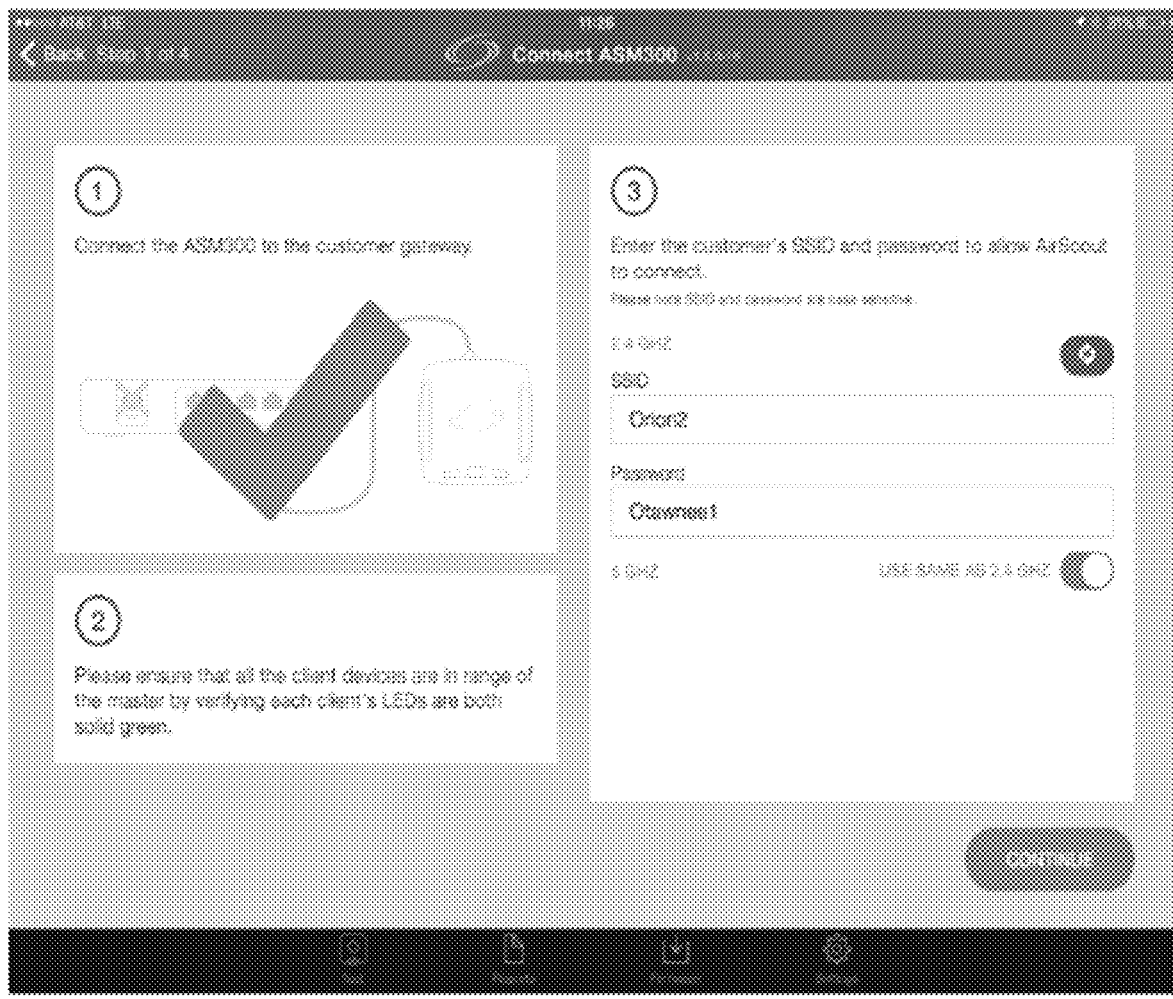

FIG. 18A shows a pre-provisioning setup page of the GUI. The setup page may allow a user to select, for example, the types of tests that the system 20 is to conduct. FIG. 18B shows a network information page which the user may utilize to provide information about the network to the user interface device 29 and/or the master controller 28. For example, the network information page may allow the user to input the SSID and the password (or other such information) for the network to be tested.

Figure 18C:
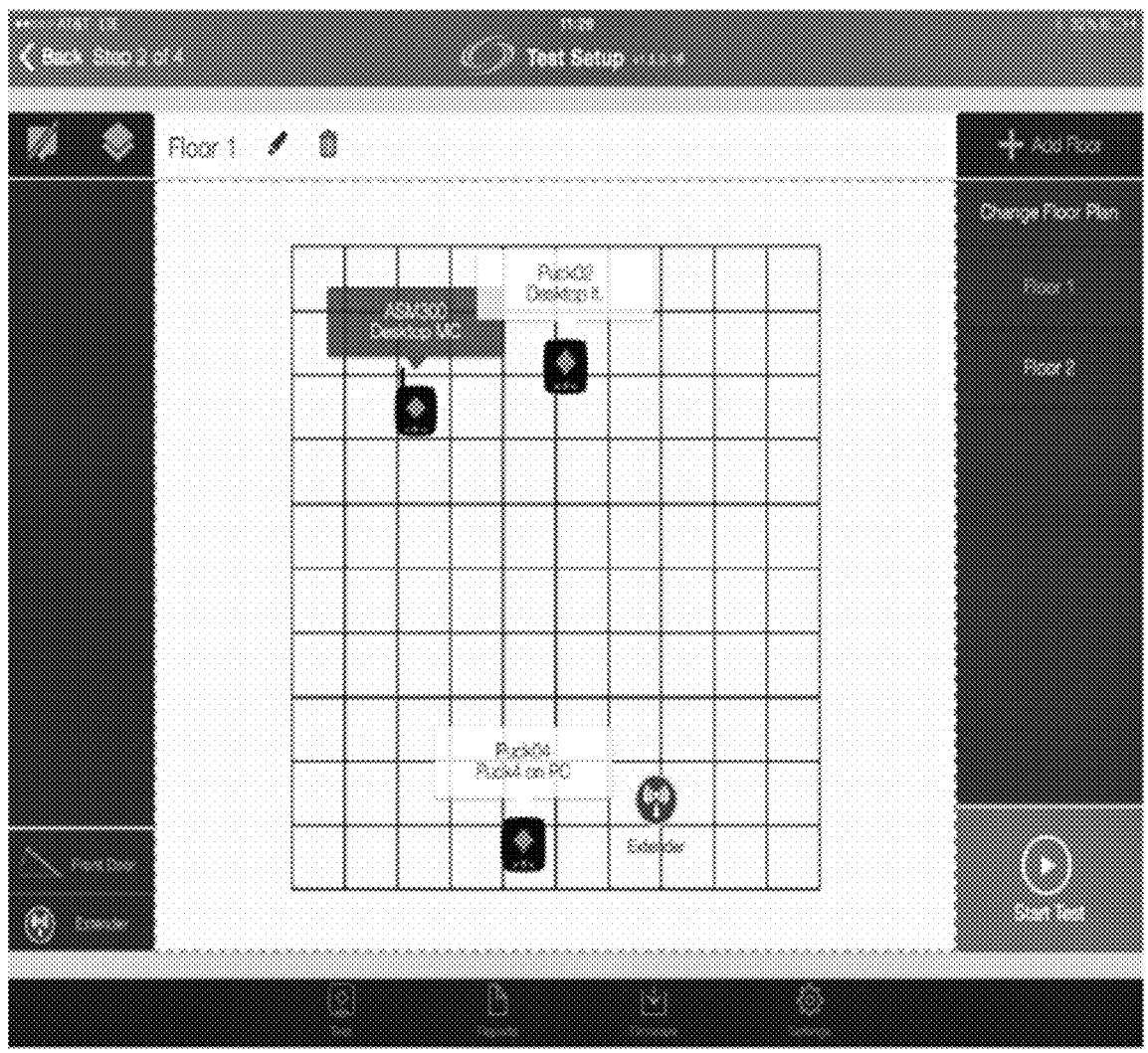
Figure 18D:
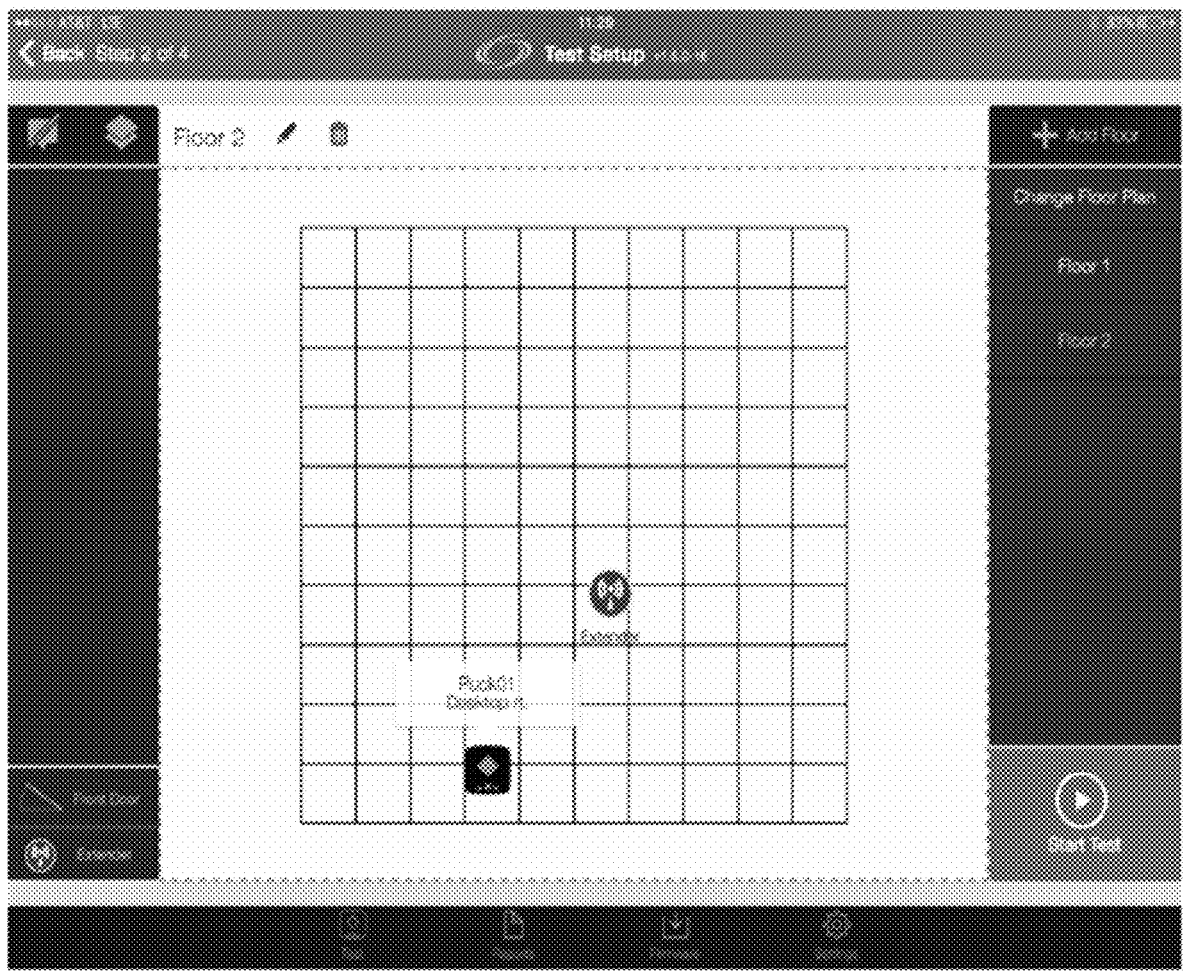
Figure 18E:
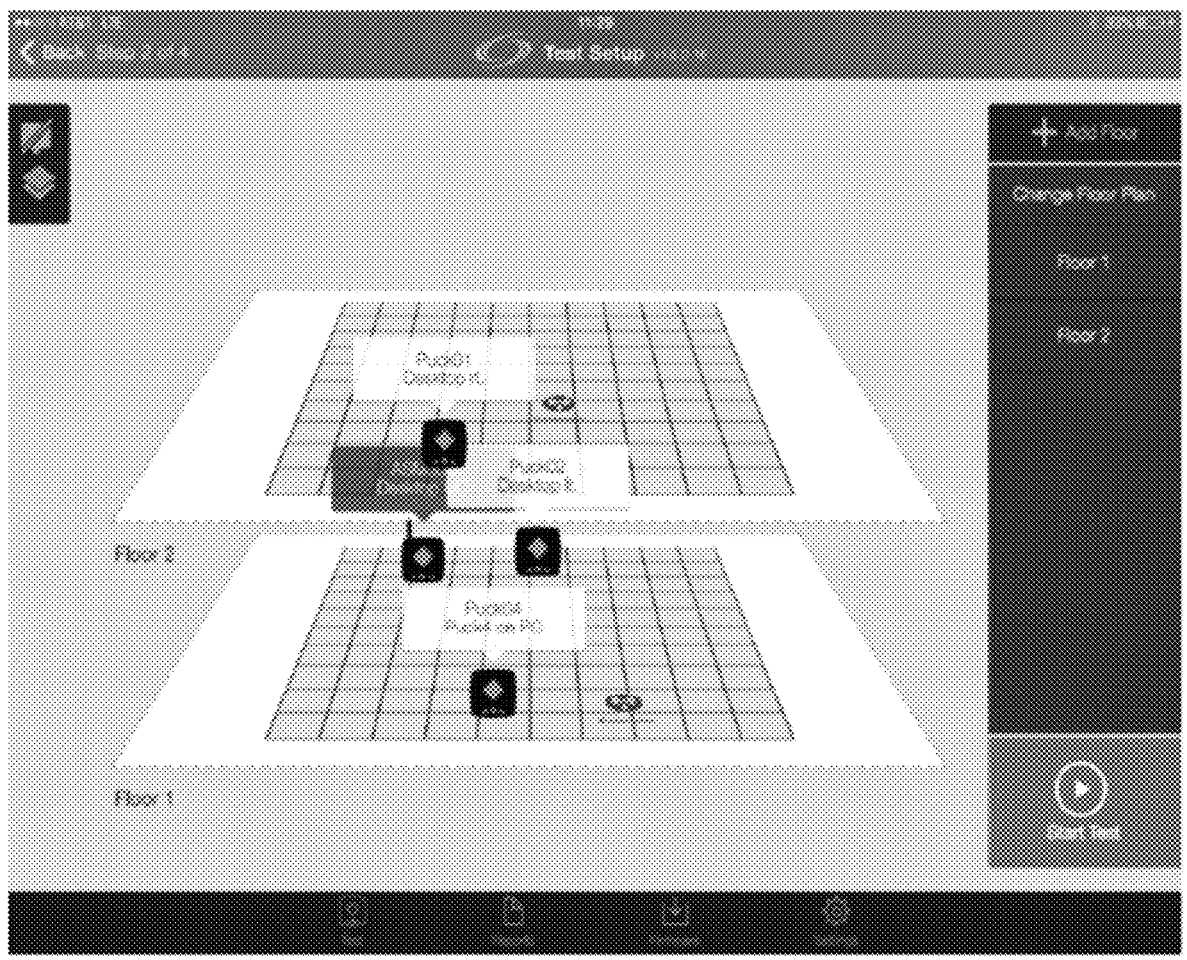

FIGS. 18C, 18D, and 18E show screen shots of example test setup pages of the GUI. FIG. 18C shows a floor plan of a first floor of an example building constituting the environment in which the performance of the multi-access point network is being evaluated. As can be seen, the user may place the devices of the system 20 on the floor plan of the GUI to obtain a visual representation of these devices in relation to the access points on the floor. FIG. 18D shows a floor plan of a second floor of the building. A user, like with FIG. 18C, may place access points and the system 20 devices on the floor plan in line with where they are physically located on the building second floor. FIG. 18E shows an isometric view of both the first and second floors, and illustrates where the access points and testing device of the system 20 are situated with respect to each other.

Figure 18F:
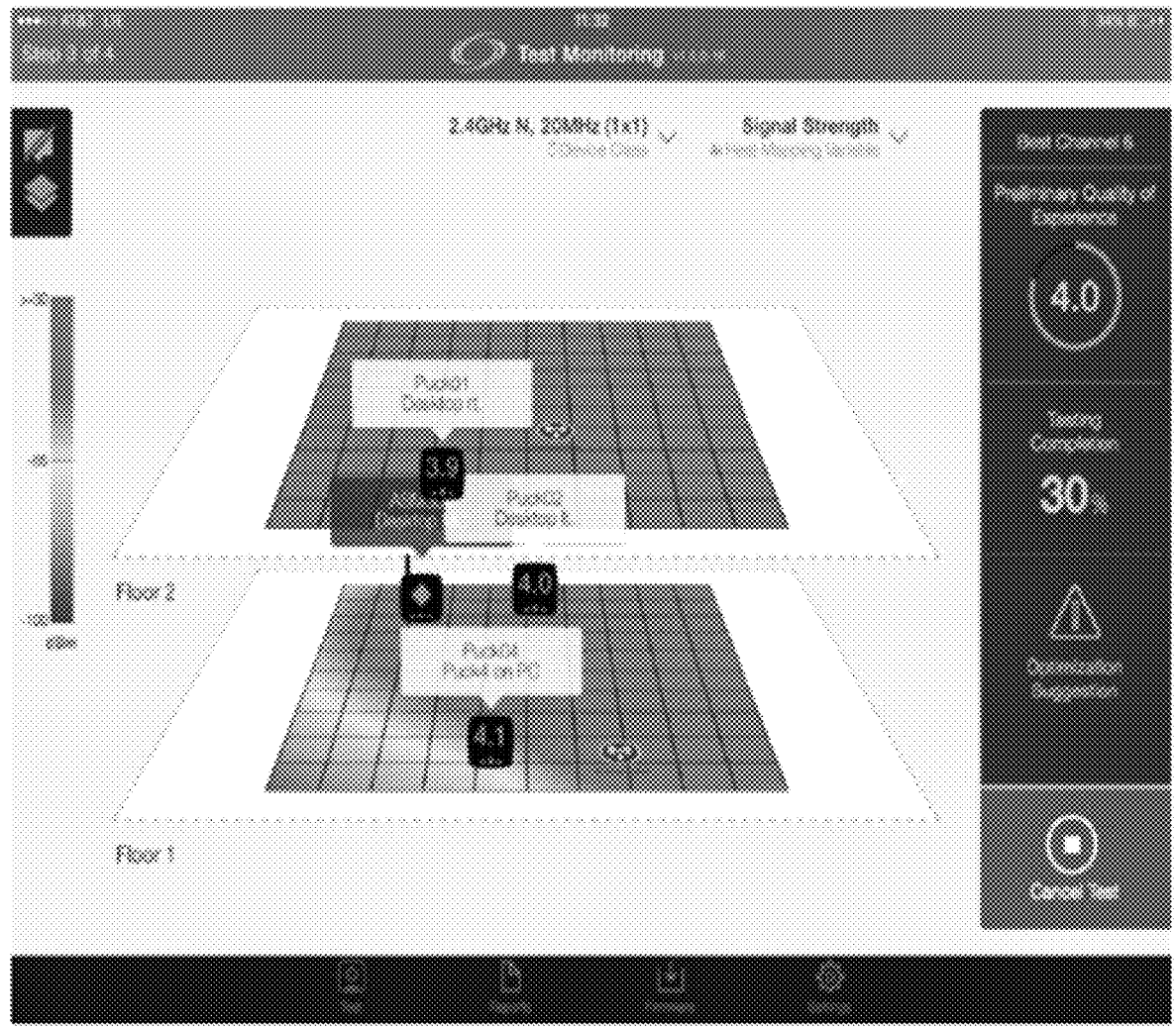
Figure 18G:
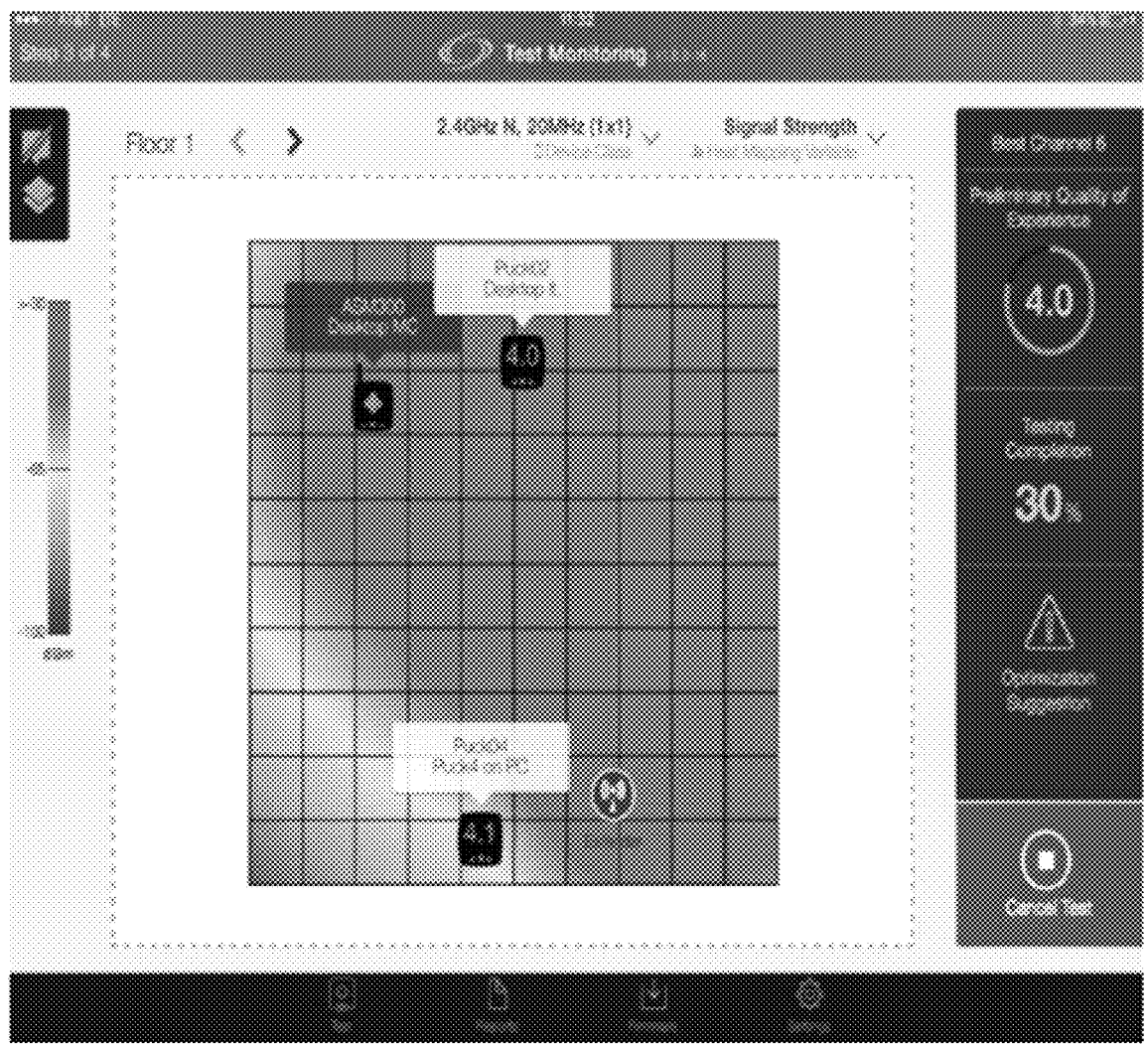
Figure 18H:
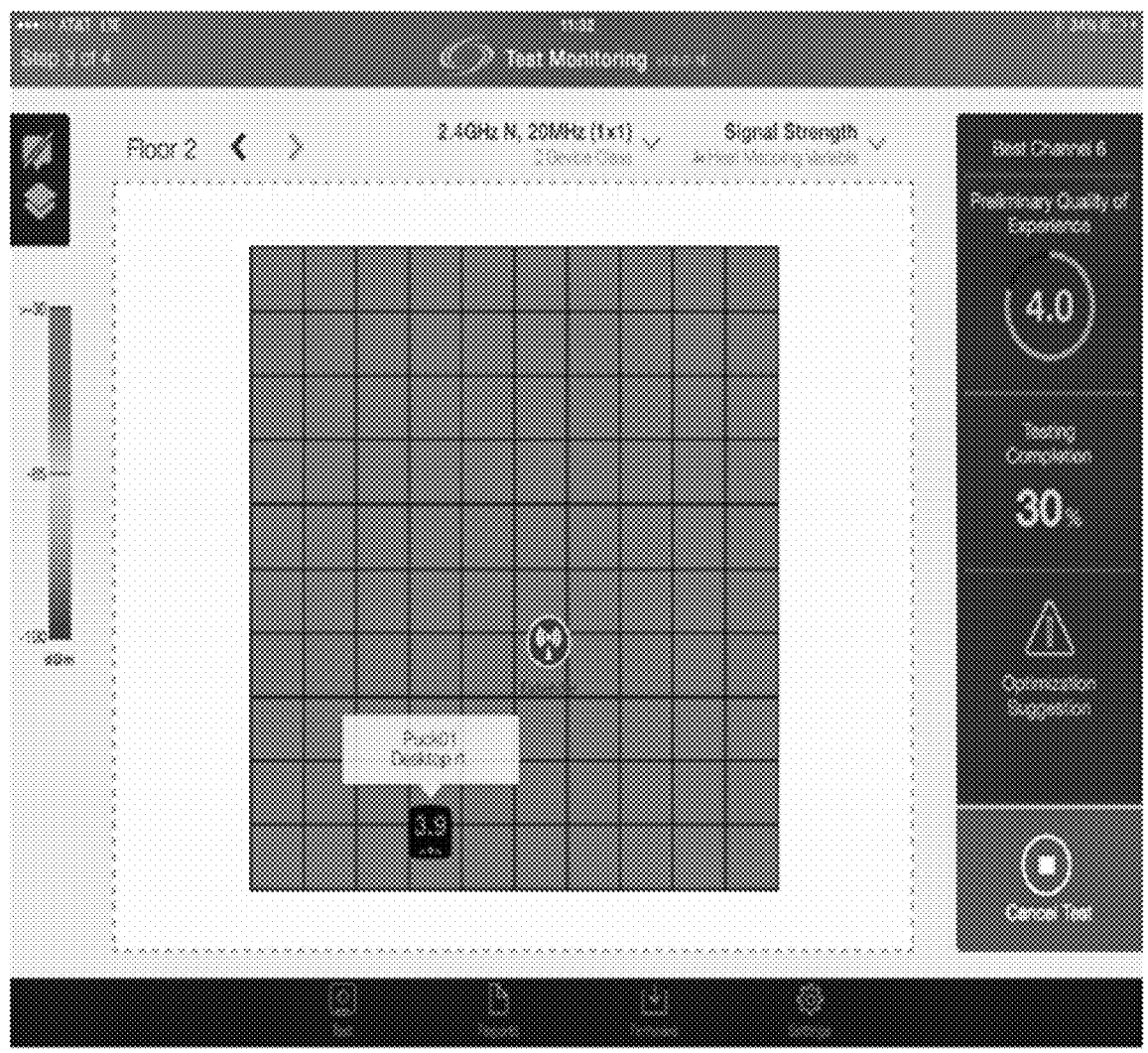

FIGS. 18F-18H shows screen shots of example test monitoring pages that outline partial results of the testing conducted by the system 20. Specifically, FIG. 18F shows a color-coded report illustrating the signal strength measurements after the system 20 wireless instruments 26 have respectively connected to the AP with the strongest signal on the first and the second floors. FIGS. 18G-18H show the report of FIG. 18F as it pertains to the measurements obtained on the first floor and the second floor, respectively.

While various example embodiments have been described with respect to application in wireless (e.g., Wi-Fi) networks having two or more access points (e.g., two or more access points), it will be appreciated that example embodiments may be applied mutatis mutandis to provide a distributed system including a master controller and one or more wireless instruments enabling analysis of wireless spectrum used by other wireless networking technologies and/or to determine appropriate placement of devices using such other wireless networking technologies.

When describing elements or features and/or embodiments thereof, the articles "a", "an", "the", and "said" are intended to mean that there are one or more of the elements or features. The terms "comprising", "including", and "having" are intended to be inclusive and mean that there may be additional elements or features beyond those specifically described.

Combinations of Features

Features described above as well as those claimed below may be combined in various ways without departing from the scope hereof. For example, it will be appreciated that aspects of a system or method for analyzing the performance of a wireless network may incorporate or swap features of another system or method for analyzing the performance of a wireless network described herein. The methods for analyzing the performance of a wireless network may incorporate features of systems disclosed herein, and systems for analyzing the performance of a wireless network may incorporate features of the disclosed methods. The following examples illustrate possible, non-limiting combinations of embodiments described above. It should be clear that many other changes and modifications may be made to the systems and methods described herein without departing from the spirit and scope of this invention:

(A1) A system for determining and optimizing wireless network performance of a wireless network having a plurality of access points in a deployment environment, comprising (a) a master controller configured to: determine initial placements for each access point of a plurality of access points based on signal coverage; (b) determine initial channel assignments for each access point of the plurality of access points based on pairs of access points sharing a channel; (c) receive wireless signal measurements from at least one wireless instrument based at least in part on the initial placements and the initial channel assignments; (d) perform an analysis of the wireless signal measurements to determine a radio frequency environment performance of the wireless network based at least in part on the wireless signal measurements from the at least one wireless instrument; and (e) adjust at least one parameter for at least one access point based at least in part on the radio frequency environment performance.

(A2) In the system denoted as (A1) the at least one parameter includes a location for the at least one access point.

(A3) In either of the systems denoted as (A1) or (A2), the at least one parameter includes a location for the at least one access point.

(A4) In either of the systems denoted as (A1) through (A3) the at least one parameter includes a channel assignment for the at least one access point.

(A5) In either of the systems denoted as (A1) through (A4), the system includes a user interface device in communication with the master controller, the user interface device configured to generate reports to indicate the radio frequency environment performance of the wireless network.

(A6) In either of the systems denoted as (A1) through (A5) the user interface device is further configured to receive network access credentials and provide them to the master controller; and the master controller is further configured to provide the network access credentials to each of the at least one wireless instruments.

(A7) In either of the systems denoted as (A1) through (A6) the master controller is configured to receive wireless signal measurements from a plurality of wireless instruments based at least in part on the initial placements and the initial channel assignments.

(B1) One or more non-transitory computer-readable media storing computer-readable instructions that, when performed by a processor, perform a method of determining and optimizing wireless network performance of a wireless network having a plurality of access points in a deployment environment, the method comprising: (a) causing receipt of indications of initial parameters of each access point of the plurality of access points; (b) causing receipt of wireless signal measurements based at least in part on the initial parameters of the plurality of access points, wherein the wireless signal measurements are obtained by a plurality of wireless instruments based at least in part on wireless signals to and from a respective plurality of access points; (c) performing an analysis of the wireless signal measurements to determine a radio frequency environment performance of the wireless network based at least in part on the respective wireless signal measurements from the plurality of wireless instruments; and (d) determining at least one parameter for at least one access point to be adjusted based at least in part on the radio frequency environment performance.

(B2) Included in the media of (B1), a process determining the initial parameters of the plurality of access points.

(B3) Included in the media of (B1) through (B2), the at least one parameter for at least one access point to be adjusted is a location of the at least one access point.

(B4) Included in the media of (B1) through (B3), at least one parameter for at least one access point to be adjusted is a transmit power for the at least one access point.

(B5) Included in the media of (B1) through (B4), determining a location for an additional access point to be added to the wireless network based at least in part on the radio frequency environment performance.

(B6) Included in the media of (B1) through (B4), the radio frequency environment performance comprises a quality-of-experience map for the deployment environment.

(B7) Included in the media of (B1) through (B6), causing to be displayed, on a user interface device, a visual representation of the quality-of-experience map for the deployment environment.

(C1) A system for determining and optimizing wireless network performance of a network having a plurality of access points in a deployment environment, comprising: (a) a master controller; (b) a user interface device; (c) at least one wireless instrument, communicatively coupled to an access point of the plurality of access points and configured to: (i) measure wireless signals to and from the access point to obtain wireless signal measurements; and (ii) communicate the wireless signal measurements to the master controller; and (d) wherein the master controller is configured to: (i) determine initial values for at least one parameter for each access point of the plurality of access points; (ii) communicate the initial values for the least one parameter for each access point of the plurality of access points to the user interface device for display; (iii) receive wireless signal measurements from the wireless instrument based at least in part on the parameters for the plurality of access points; (iv) perform an analysis of the wireless signal measurements to determine a radio frequency environment performance of the wireless network based at least in part on the wireless signal measurements from the wireless instrument; (v) communicate the radio frequency environment performance to the user interface device for display; (vi) adjust at least one parameter for at least one access point based at least in part on the radio frequency environment performance; and (e) wherein the user interface device is configured to: (i) display the initial values for the least one parameter for each access point of the plurality of access points; and (ii) display a visual representation of the radio frequency environment performance.

(C2) Included in the system of (C1) the user interface device is coupled to the master controller via a wired connection.

(C3) Included in the systems of (C1) through (C2), the user interface device is part of the master controller.

(C4) Included in the systems of (C1) through (C3), the user interface is further configured to: (a) receive, from a user, a constraint on a determined initial location for an access point of the plurality of access points; (b) present, to the user, an updated location for the access point; and (c) the master controller is further configured to determine an updated location for the access point based at least in part on the received constraint.

(C5) Included in the systems of (C1) through (C4), the initial values for at least one parameter for each access point of the plurality of access points comprise an initial location for each access point, an initial transmit power for each access point, and an initial channel assignment for each access point.

(C6) Included in the systems of (C1) through (C5), the visual representation of the radio frequency environment performance includes a heat map of a quality-of-experience metric over the deployment environment.

Indeed, many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations. Not all operations listed in the various figures need be carried out in the specific order described.

The invention claimed is:

1. A system for determining and optimizing wireless network performance of a wireless network having a plurality of access points in a deployment environment, comprising:
    a master controller configured to:
    determine initial placements for each access point of a plurality of access points based on signal coverage;
    determine initial channel assignments for each access point of the plurality of access points based on pairs of access points sharing a channel;
    receive wireless signal measurements from a plurality of test-dedicated, test-stationary wireless instruments based at least in part on the initial placements and the initial channel assignments;
    perform an analysis of the wireless signal measurements to determine a radio frequency environment performance of the wireless network based at least in part on the wireless signal measurements from the plurality of test-stationary wireless instruments; and
    adjust at least one parameter for at least one access point based at least in part on the radio frequency environment performance.

2. The system of claim 1, wherein the at least one parameter includes a channel assignment for the at least one access point.

3. The system of claim 1, further comprising a user interface device in communication with the master controller, the user interface device configured to generate reports to indicate the radio frequency environment performance of the wireless network.

4. The system of claim 3, wherein:
    the user interface device is further configured to receive network access credentials and provide them to the master controller; and
    the master controller is further configured to provide the network access credentials to each of the at least one wireless instruments.

5. The system of claim 3, wherein the master controller is configured to receive wireless signal measurements from a plurality of wireless instruments based at least in part on the initial placements and the initial channel assignments.

6. The system of claim 1, wherein the master controller is configured to receive information based on analysis performed by the plurality of wireless instruments.

7. The system of claim 1, wherein the plurality of wireless instruments do independent analysis of the quality of the radio frequency environment.

8. The system of claim 1, wherein the plurality of wireless instruments are configured to emulate data-receiving or transmitting properties of a variety of wireless devices.

9. The system of claim 1, wherein the at least one parameter includes a location for the at least one access point.

10. The system of claim 1, wherein the at least one parameter includes a suggested location for all of the access points in the plurality.

11. A system for determining and optimizing wireless network performance of a network having a plurality of access points in a deployment environment, comprising:
    a master controller;
    a user interface device;
    at least one static wireless instrument communicatively coupled to an access point of the plurality of access points and configured to:
    emulate data-receiving or transmitting properties of a wireless device intended for deployment;
    measure wireless signals to and from the access point to obtain wireless signal measurements;
    perform analysis based on the wireless signal measurements; and
    communicate the analysis performed to the master controller;
    wherein the master controller is configured to:
    determine initial values for at least one parameter for each access point of the plurality of access points;
    communicate the initial values for the least one parameter for each access point of the plurality of access points to the user interface device for display;
    receive wireless signal measurements from the at least one wireless instrument based at least in part on the parameters for the plurality of access points;
    perform an analysis of the wireless signal measurements to determine a radio frequency environment performance of the wireless network based at least in part on the analysis made by the at least one wireless instrument;
    communicate the radio frequency environment performance to the user interface device for display;
    adjust at least one parameter for at least one access point based at least in part on the radio frequency environment performance; and
    wherein the user interface device is configured to:

display the initial values for the least one parameter for each access point of the plurality of access points;
make a relocation suggestion regarding the at least one access point and
display a visual representation of the radio frequency environment performance.

12. The system of claim 11, wherein the user interface device is part of the master controller.

13. The system of claim 11, wherein
the user interface is further configured to:
receive, from a user, a constraint on a determined initial location for an access point of the plurality of access points;
present, to the user, an updated location for the access point; and
the master controller is further configured to:
determine an updated location for the access point based at least in part on the received constraint.

14. The system of claim 11, wherein the initial values for at least one parameter for each access point of the plurality of access points comprise an initial location for each access point, an initial transmit power for each access point, and an initial channel assignment for each access point.

15. The system of claim 11, wherein the visual representation of the radio frequency environment performance includes a heat map of a quality-of-experience metric over the deployment environment.

16. The system of claim 11 wherein the suggested relocation is made for all of the access points in the plurality.

17. A system for evaluating a deployment for a plurality of access-points (APs) into a network environment, the system, comprising:
a test-dedicated, deployable master controller configured to:
determine initial placements for each access point in the plurality of access points based on signal coverage;
determine initial channel assignments for each access point of the plurality;
receive wireless signal measurements from a plurality of static test-dedicated wireless devices;
perform an analysis of wireless signal measurements in the network environment to determine a performance of the wireless network based at least in part on the wireless signal measurements from the plurality of stationary wireless instruments; and;
the master controller further configured to both: (i) suggest a change in any of the initial channel assignments; and (ii) provide relocation suggestions for each access point in the plurality.

18. The system of claim 17 wherein each wireless instrument in the plurality of wireless instruments is configured to emulate the wireless functional characteristics of a particular sort of wireless device.

* * * * *